(12) United States Patent
Lee et al.

(10) Patent No.: US 11,621,855 B2
(45) Date of Patent: Apr. 4, 2023

(54) ELECTRONIC DEVICE AND METHOD FOR MANAGING BLOCKCHAIN ADDRESS USING THE SAME

(71) Applicant: Samsung Electronics Co., Ltd., Suwon-si (KR)

(72) Inventors: Sunghyuk Lee, Suwon-si (KR); Sooyeon Kim, Suwon-si (KR); Juyoung Kim, Suwon-si (KR); Jaehun Jung, Suwon-si (KR); Jinki Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 256 days.

(21) Appl. No.: 17/062,949

(22) Filed: Oct. 5, 2020

(65) Prior Publication Data
US 2021/0105142 A1 Apr. 8, 2021

(30) Foreign Application Priority Data
Oct. 7, 2019 (KR) .......................... 10-2019-0124090

(51) Int. Cl.
*H04L 9/32* (2006.01)
*H04L 9/08* (2006.01)
*H04L 9/00* (2022.01)

(52) U.S. Cl.
CPC .......... *H04L 9/3247* (2013.01); *H04L 9/0825* (2013.01); *H04L 9/0894* (2013.01); *H04L 9/3213* (2013.01); *H04L 9/50* (2022.05)

(58) Field of Classification Search
None
See application file for complete search history.

(56) References Cited

U.S. PATENT DOCUMENTS

| 8,448,260 | B1 | 5/2013 | Hansen |
| 10,873,559 | B2 | 12/2020 | Khan et al. |
| 10,951,414 | B2 * | 3/2021 | Laremenko ............. G07F 7/082 |
| 11,038,685 | B1 * | 6/2021 | Dennis .................. H04L 9/3239 |

(Continued)

FOREIGN PATENT DOCUMENTS

| KR | 10-2016-0101635 A | 8/2016 |
| KR | 10-2018-0079805 A | 7/2018 |

(Continued)

OTHER PUBLICATIONS

International Search Report dated Jan. 15, 2021, issued in International Application No. PCT/KR2020/013213.

(Continued)

*Primary Examiner* — Bassam A Noaman
(74) *Attorney, Agent, or Firm* — Jefferson IP Law, LLP

(57) ABSTRACT

An electronic device that performs a digital signature for a blockchain address and first information associated with the blockchain address using a private key, associates and stores signature data obtained as a result of performing the digital signature with at least one of the blockchain address or the first information, performs authentication for the blockchain address and the first information using a public key corresponding to the private key, based on the stored signature data, and displays the blockchain address and the first information, based on the result of performing the authentication is provided.

18 Claims, 23 Drawing Sheets

(56) References Cited

U.S. PATENT DOCUMENTS

| | | |
|---|---|---|
| 11,303,603 B2 | 4/2022 | Khan et al. |
| 2018/0183587 A1 | 6/2018 | Won et al. |
| 2018/0341775 A1 | 11/2018 | Gisolfi et al. |
| 2019/0019180 A1* | 1/2019 | Coburn .................. H04L 9/0637 |
| 2019/0080300 A1* | 3/2019 | Stojanovski ....... G06Q 20/3829 |
| 2019/0104102 A1 | 4/2019 | Khan et al. |
| 2019/0172067 A1 | 6/2019 | Arora et al. |
| 2019/0303931 A1 | 10/2019 | Valencia |
| 2020/0014531 A1* | 1/2020 | Falco .................. H04L 63/0884 |
| 2020/0117690 A1* | 4/2020 | Tran .................. G06F 16/90332 |
| 2020/0258176 A1* | 8/2020 | Gibson ................ G06Q 10/083 |
| 2020/0313901 A1* | 10/2020 | Lin ........................ H04L 9/3239 |
| 2020/0327511 A1* | 10/2020 | Zhuang ................. H04L 9/3247 |
| 2021/0021597 A1* | 1/2021 | Salman ................. H04L 9/3239 |
| 2021/0083872 A1* | 3/2021 | Desmarais ......... G06Q 20/3825 |
| 2022/0103366 A1* | 3/2022 | Shubrook ............. H04L 9/3239 |

FOREIGN PATENT DOCUMENTS

| | | |
|---|---|---|
| KR | 10-2018-0129027 A | 12/2018 |
| KR | 10-2019-0111748 A | 10/2019 |
| KR | 10-2077334 B1 | 2/2020 |
| WO | 2013/177424 A1 | 11/2013 |

OTHER PUBLICATIONS

Dai et al., SBLWT: A Secure Blockchain Lightweight Wallet Based on Trustzone, XP011688415, Jun. 8, 2018.

Extended European search report dated Aug. 12, 2022, issued for the corresponding European patent application Application No. 20875551.2.

\* cited by examiner

400

```
┌─────────────────────────────────────────────┐
│ □ Transaction confirmation                  │
├─────────────────────────────────────────────┤
│                                             │
│      Make sure the details below are correct│
│         before confirming this transaction. │
│   ┌─────────────────────────┐  ┌─────────┐  │
│   │ Om▓go Coin              │  │  ○○     │  │
│   │ OMG                     │  │   ○     │  │
│   └─────────────────────────┘  └─────────┘  │
│  Smart Contact address:                     │
│  0xd26114cd6EE289AccF82350c8d8487fedB8A0C07 │
│                                             │
│  Amount                         0.01 ETH    │
│  Gas price               0.000000022 ETH    │
│  Maximum gas price          0.000462 ETH    │
│                                             │
│  Type                        ERC20 Transfer │
│  Recipient address                          │
│         ┌──────────────────┐                │
│         │Nickname:Jane     │                │
│  411 ───│Group:Family      │ ⊘ ── 412       │
│         └──────────────────┘                │
│  410 ──┤0x3f5ce5fbfe3e0af3971dd833d26ba9b5c936f0be│
│  Token Amount                           32  │
│                                             │
├─────────────────────────────────────────────┤
│                   Confirm                   │
└─────────────────────────────────────────────┘
```

1210 < Confirm PIN

Confirm your PIN.

1211 → [• • • • • •]

[1] [2] [3]
[4] [5] [6]
[7] [8] [9]
[⌫] [0]

1220 < Verify Tokens

SELECT SAVE OR NEXT ONLY WHEN THE SMART CONTACT ADDRESS OF THE TOKEN TO BE SAVED IS CORRECT.
TOKEN ADDRESS, TOKEN NAME, AND SYMBOL ARE DISPLAYED TOGETHER FROM THE NEXT TRANSACTION.

Token Name: TrueUSD
Token Symbol: TUSD
Contact Address: 0x0000000000085d4780B73119b644AE5ecd22b376

Verify with fingerprint
Use PIN
◎ ← 1221

FIG. 12

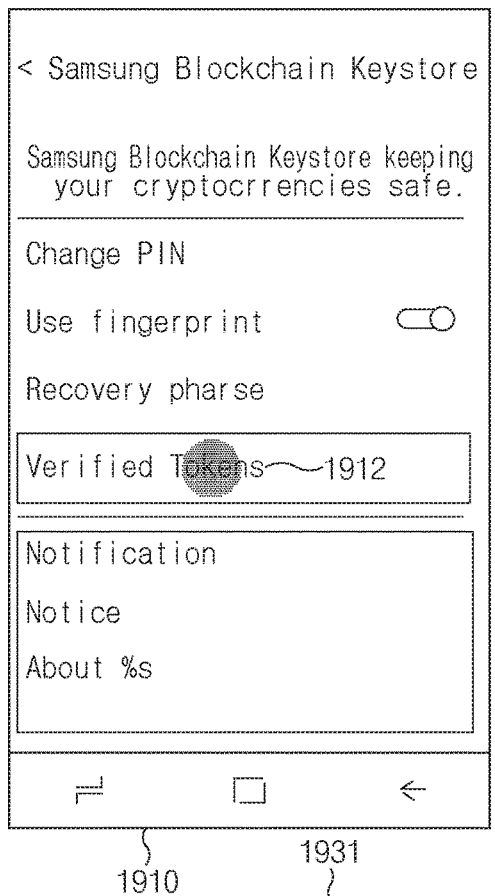
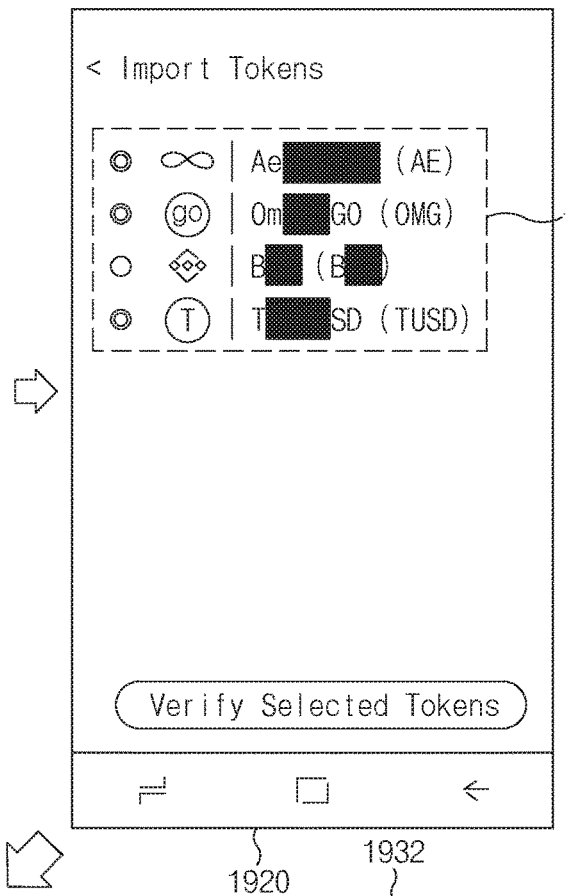
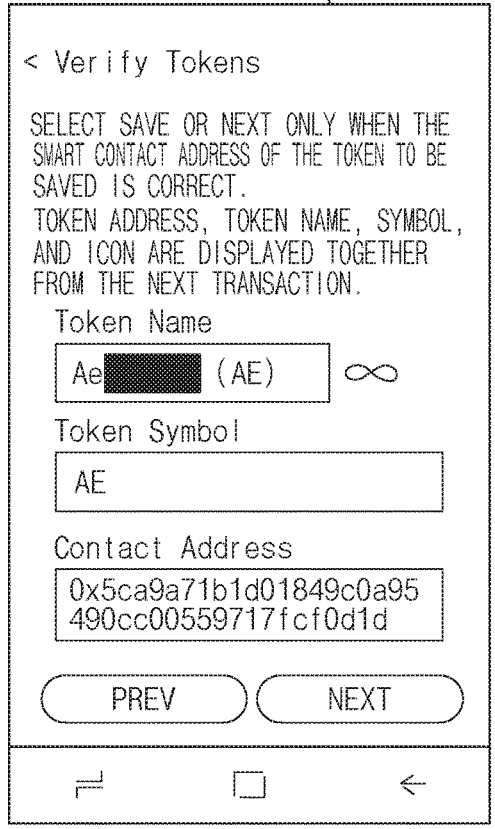
FIG.19

ELECTRONIC DEVICE AND METHOD FOR MANAGING BLOCKCHAIN ADDRESS USING THE SAME

CROSS-REFERENCE TO RELATED APPLICATION(S)

This application is based on and claims priority under 35 U.S.C. § 119(a) of a Korean patent application number 10-2019-0124090, filed on Oct. 7, 2019, in the Korean Intellectual Property Office, the disclosure of which is incorporated by reference herein its entirety.

BACKGROUND

1. Field

The disclosure relates to an electronic device and technologies for allowing the electronic device to manage a blockchain address.

2. Description of Related Art

A digital signature is a technology for preventing electronic documents or digital data from being falsified and identifying an entity who generates the signature, which is used when exchanging an electronic document or performing an electronic commerce based on an information and communications network.

A blockchain technology of generating a block for an transaction authenticated through the collaboration of participants who participates in the blockchain network, allowing the participants who participates in the blockchain network to have information in the form of a blockchain, which is stored after connecting the generated block with a previous block, and preventing forgery of data, which is capable of being generated by some users, is applied in various fields. The blockchain may be roughly divided into a public blockchain and a private blockchain. The public blockchain may be used as a technology of maintaining security and integrity in a decentralized network environment which does not have a centralized server. For example, the blockchain technology maintains the security and the integrity and is used for an e-currency or cryptocurrency service.

A blockchain address may be used to process a transaction based on the blockchain technology. In other words, to specify an entity and a target of the blockchain transaction, the blockchain address configured in a predetermined format may be used.

The above information is presented as background information only to assist with an understanding of the disclosure. No determination has been made, and no assertion is made, as to whether any of the above might be applicable as prior art with regard to the disclosure.

SUMMARY

As an example of using a blockchain technology, an Ethereum network is a blockchain platform capable of performing smart contracts included in a block after participants (e.g., nodes) who participate in the blockchain generate the block. For example, in the Ethereum platform, a participation node (e.g., an Ethereum client) which participates in the blockchain network may verify validity for a transaction using a consensus algorithm (e.g., Proof of Work, Proof of Stake, Practical Byzantine Fault Tolerance) and may approve the transaction based on the verified result. The approved transaction may be included in the block and may be stored together with the previous block. For example, the scheme of storing the approved transactions in the blocks may be referred to as a blockchain technology. Furthermore, cryptocurrency may be transmitted and received using the blockchain technology. In this case, to transmit and receive cryptocurrency, a digital wallet may be used. In this case, the digital wallet may provide a function capable of managing information of a user and an encrypted key.

When the user tries to transmit cryptocurrency in the blockchain, the blockchain technology may process a transaction for transmitting and receiving the cryptocurrency. For example, the transaction may include, for example, one transaction, 'A transmits 100BTC to B'. The transaction in the blockchain may include information associated with a sender who sends cryptocurrency, a receiver who receives cryptocurrency, or the amount of cryptocurrencies to be transmitted. A blockchain system and the digital wallet may use a digital signature algorithm to process a transaction. The blockchain may guarantee the legitimacy that the transaction is not forged or falsified by the digital signature. The blockchain performs a digital signature when generating a transaction. For example, the blockchain may assign a digital signature to each transaction one by one. Furthermore, a public key for verifying the digital signature may be included as a set. To generate a transaction in the blockchain, there is a need for a pair of a secret key and a public key corresponding to the secret key. For example, the electronic device may generate a secret key and a public key corresponding to the secret key by an asymmetric algorithm. The asymmetric algorithm may generate and use a key over 256 bits, using, for example, an elliptic curve digital signature algorithm (ECDSA). The electronic device may perform a digital signature using a private key when using a transaction, and nodes which participate in the blockchain network may verify the digital signature using a public key. The operation of verifying the digital signature may include an operation of determining whether the third party (e.g., a hacker) forges or falsifies transaction contents, an operation of determining whether the third party performs a transaction through appropriation, or an operation of determining whether a transaction is generated by an authorized owner of cryptocurrency. All transactions verified by nodes may be stored in the blockchain, and a digital signature and a public key may be stored as a set in each transaction. To process a transaction, the blockchain may use a blockchain address formed in a predetermined format (e.g., a HEX string of 40 characters obtained by combining numbers, lowercase English alphabets, and uppercase English alphabets) in the blockchain system. In other words, the blockchain system may identify a digital wallet which is an entity or a target of a blockchain transaction based on a blockchain address. However, because the blockchain address consists of a meaningless long string recognizable by the user, it is difficult for the user to identify whether the target of the blockchain transaction is a target intended by the user. Thus, when one of characters included in the blockchain address is incorrect, there is a risk that an abnormal transaction will occur or that the transaction will not be performed.

When the blockchain address is hacked by an external attacker, there is a risk that information about a target different from a target of the real blockchain address will be displayed on the electronic device. For example, the blockchain address is displayed as a family member of the user of the electronic device on the electronic device. However, when the blockchain address included in real transaction data is changed to an attacker address by an external attacker, a transaction may be established with respect to the address of the external attacker rather than the family member of the user. For example, the user may remit cryptocurrency to the attacker. As an example of such a hacking method of an attack technique, there is clipboard hijacking. The clipboard hijacking is to change an address entered in a target item of a transaction to an address of a hacker, when the user copies a blockchain address into the target item of the transaction. When any address is changed in the middle of the transaction, users need to identify whether the entered address is a normal address in detail to prevent a wrong transaction from being generated.

The blockchain system may have a main network. A participant who participates in the blockchain system may perform a transaction using cryptocurrency (coins) over the main network. A token may be used as a coin in a value unit capable of indicating a unique value in the blockchain. The token may be used as an exchange means for a transaction in the blockchain. Alternatively, the token may be used as compensation for authentication for a transaction based on the blockchain. In the main network, a protocol may be used such that the user generates a token using core cryptocurrency (coins). For example, the Ethereum platform may issue a customized token to the user using the ERC20 protocol. According to an embodiment of the disclosure, a smart contract may be operated in the blockchain network. A developer of the blockchain network may additionally generate a token through the smart contract. For example, the token generated in Ethereum may be generated by a smart contract and may be managed by a unique smart contract.

For a transaction based on the token, because information about a receiver of the transaction further includes address information of a token program and information of a token receiver, there are more items the user should identify.

A participant (e.g., an enterprise, a group, a person, or the like) who participates in the blockchain network may construct a decentralized application (Dapp) using a protocol of the blockchain and may generate each unique token. For example, a blockchain system of Ethereum may generate and manage a token using ERC-20 which is a standard of the token protocol. In this case, blockchain transaction information associated with the token may be provided to the third party (e.g., an enterprise, a person, a group, or the like), and the electronic device may obtain contents for the blockchain transaction information. For example, for Ethereum, the electronic device may receive information of the token used in the blockchain system of Ethereum online through a site (e.g., Etherscan) of analyzing and posting a block.

Because information about the token is manipulated in the process of delivering the information, reliability for a transaction may not be enhanced by only displaying information about a target to be transacted through a trusted user interface.

Aspects of the disclosure are to address at least the above-mentioned problems and/or disadvantages and to provide at least the advantages described below. Accordingly, as aspect of the disclosure is to provide an electronic device and technologies for allowing the electronic device to manage a blockchain address.

Additional aspects will be set forth in part in the description which follows and, in part, will be apparent from the description, or may be learned by practice of the presented embodiments.

In accordance with an aspect of the disclosure, an electronic device is provided. The electronic device includes a display and at least one processor connected with the display. The at least one processor may be configured to perform a digital signature for a blockchain address and first information associated with the blockchain address using a private key, associate and store signature data obtained as a result of performing the digital signature with at least one of the blockchain address and the first information, perform authentication for the blockchain address and the first information using a public key corresponding to the private key, based on the stored signature data, and control the display to display the blockchain address and the first information, based on the result of performing the authentication.

In accordance with another aspect of the disclosure, an electronic device is provided. The electronic device includes a display, a memory associating and storing first information associated with a blockchain transaction target with a blockchain address, and at least one processor connected with the display and the memory. The at least one processor may be configured to generate blockchain transaction data to be transmitted to a blockchain network, obtain the first information based on the blockchain address included in the blockchain transaction data, perform authentication for the blockchain address and the first information based on a private key, output the blockchain address and the first information, when the authentication is valid, receive a user input approving the blockchain transaction data, perform a digital signature for the blockchain transaction data using the private key, in response to the user input, and transmit the digitally signed blockchain transaction data to the blockchain network.

In accordance with another aspect of the disclosure, a method is provided. The method includes performing a digital signature for a blockchain address and first information associated with the blockchain address using a private key, associating and storing signature data obtained as a result of performing the digital signature with at least one of the blockchain address and the first information, performing authentication for the blockchain address and the first information using a public key corresponding to the private key, based on the stored signature data, and displaying the blockchain address and the first information on a display of the electronic device, based on the result of performing the authentication.

In accordance with another aspect of the disclosure, a method is provided. The method includes associating and storing first information associated with a blockchain transaction target with a blockchain address, generating blockchain transaction data to be transmitted to a blockchain network, obtaining the first information based on the blockchain address included in the blockchain transaction data, performing authentication for the blockchain address and the first information based on a private key, outputting the blockchain address and the first information, when the authentication is valid, receiving a user input approving the blockchain transaction data, and performing a digital signature for the blockchain transaction data using the private key, in response to the user input.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 is a drawing illustrating a verification screen displaying a blockchain address on an electronic device according to an embodiment of the disclosure;

FIG. 8 is a drawing illustrating a blockchain address authentication request being generated based on a contact sharing function according to an embodiment of the disclosure;

FIG. 9 is a drawing illustrating an electronic device receiving a blockchain address authentication request in a blockchain transaction process according to an embodiment of the disclosure;

FIG. 12 is a drawing illustrating a screen displayed in a process where an electronic device executes a user authentication process according to an embodiment of the disclosure;

FIG. 19 is a drawing illustrating a process where an electronic device obtains and stores token information according to an embodiment of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
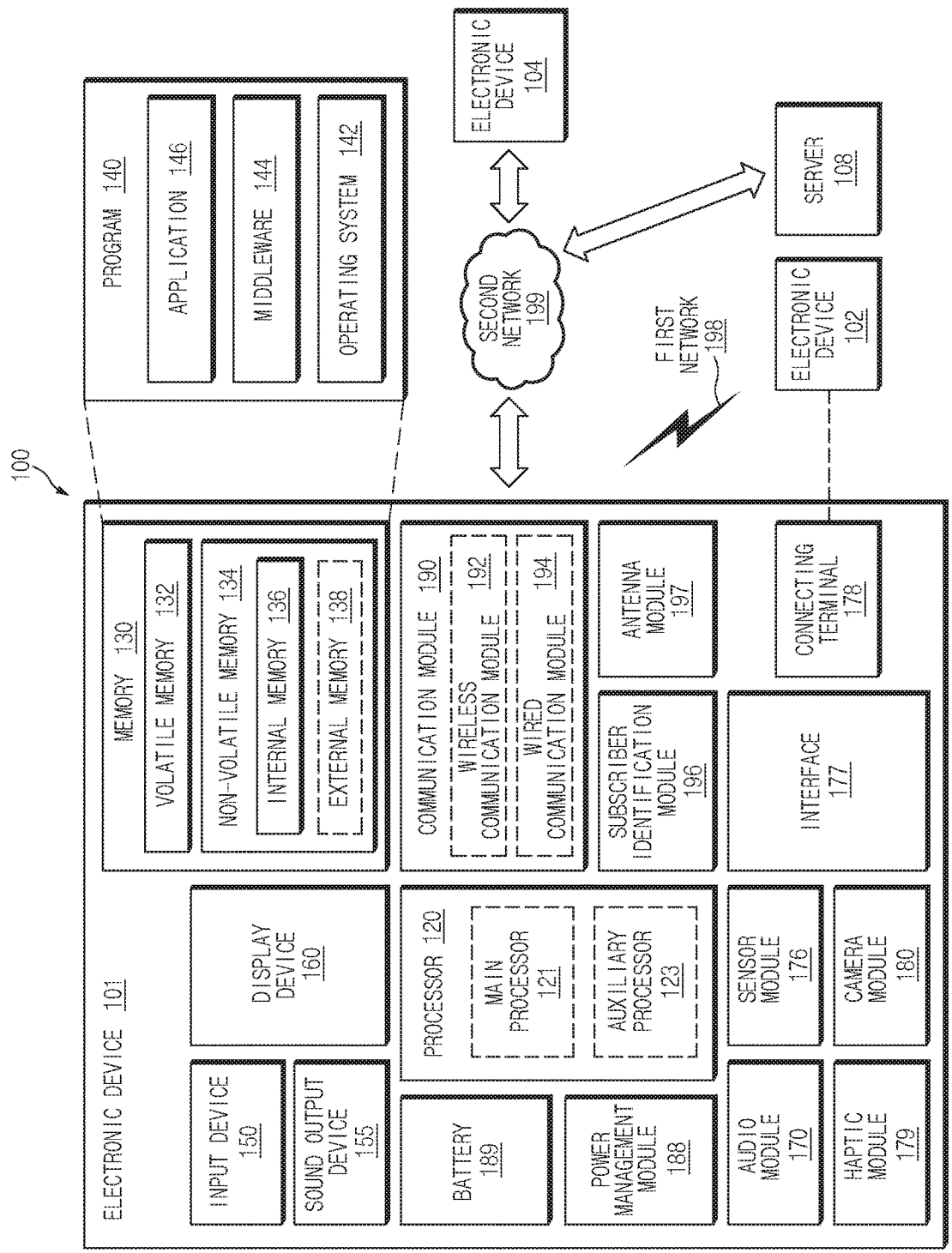
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments of the disclosure, at least one (e.g., the display device 160 or the camera module 180) of the components may be omitted from the electronic device 101, or one or more other components may be added in the electronic device 101. In some embodiments of the disclosure, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment of the disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment of the disclosure, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment of the disclosure, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., printed circuit board (PCB)). According to an embodiment of the disclosure, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

A private key and a public key used in a blockchain may be generated based on an asymmetric algorithm. An asymmetric encryption algorithm may use an encryption algorithm, such as Rivest-Shamir-Adleman (RSA), Elliptic curve cryptography (ECC), or digital signature algorithm (DSA). A symmetric encryption algorithm has an encryption key and a decryption key, which are the same as each other, and the asymmetric algorithm uses an encryption key and a decryption key, which differ from each other. The public key may be open and may be accessed by another user. For example, when a sender performs encryption using a public key of a receiver, a receive end may perform decryption using a private key to identify the encrypted contents. The public key may be used for a digital signature. An electronic device may identify that a public key signature is made using a specific secret key and may know that the public key signature is digitally signed by a person who has a private key. For example, a cipher text encrypted with a private key may be decrypted with a corresponding public key. When the digital signature is performed by encryption and a signature using a private key, a device which verifies the signature may perform decryption with a public key. The device which verifies the signature may compare a value of hashing decrypted data with a value of hashing transmitted data to perform signature authentication. The blockchain may use a signature using such a private key and a public key. For example, the private key may be used as a password a user uses to generate a transaction and may be used to generate a blockchain address using a public key. For example, the electronic device may generate a public key by an elliptic curve algorithm using a private key and may generate the generated public key as an address capable of being used in the blockchain through a hash function. The private key may be configured with a number randomly extracted. The private key may be generated as a 256-bit number. The private key may be generated from a root seed. The root seed is a default value capable of generating many keys and addresses from one. The electronic device may recover key values generated through the root seed. The root seed may use a mnemonic word sequence. The mnemonic word sequence may include words recognizable by a person.

According to various embodiments of the disclosure, the root seed may use various types of seeds. For example, the root seed may use a seed configured with a hexadecimal number or may use a seed configured with a mnemonic of 12 words. In this case, the mnemonic may include a word form recognizable by the user. In this case, the root seed may use a mnemonic based on the bitcoin improvement proposal (BIP)-39 standard. A mnemonic code and a seed may be generated based on the BIP-39 standard. A 512-bit seed may be generated using a key stretching function by using words included in the seed and a salt value (e.g., a code input from the user) as factors. The key stretching function (e.g., PBKDF2) may output a certain (512-bit) value using two factor values. For example, the key stretching function may repeatedly hash two factor values using a hash algorithm (e.g., HMAC-SHA512) and may generate a final output value as the root seed.

The electronic device may generate a private key and a public key using the root seed. For example, the root seed may generate a master private key and a master chain code from a hash value generated through an HMAC-SHA512 function. 256 bits at the left of a 512-bit hashed value may be used as a private key, and 256 bits at the right of the 512-bit hashed value may be used as a chain code. The public key may be used using a private key and an elliptic curve function. When a transaction is generated in a blockchain, a signature using a private key and a public key may be performed. For example, the sender writes a transaction message for a transaction, may encrypt the message with a private key of the sender, and may generate a signature. The generated signature may be decrypted with only a public key. The generated signature and the transaction message may be transmitted together on the blockchain. In this case, the public key may be released together. A device which verifies a digital signature may decrypt a signature with a public key and may compare the decrypted signature with a message included in the transaction. When the signature is identical to the message, the device may determine that the signature is encrypted with a normal private key. According to an embodiment of the disclosure, the electronic device may digitally sign an address and additional information associated with the address, using a private key used for a transaction and may store the signed value, address, and additional information therein. When the user wants to generate a transaction, the electronic device may display additional information together to more easily notify the user of information about an address of a destination. To identify that the address, the additional information, or the like stored in an untrusted zone is not forged or falsified, authentication for a digital signature may be performed. According to an embodiment of the disclosure, the electronic device may request a trusted application run on an operating system with strengthened security or a trusted application with strengthened security, which is run on the untrusted zone, to identify a signature. In this case, the electronic device may deliver at least one of a blockchain address stored in the untrusted zone, additional information, a blockchain address for a transaction, or a digital signature value. The trusted application may decrypt a digital signature value using a public key, may generate a hash value by hashing a blockchain address among the decrypted values, and compare the generated hash value with a hash value generated by hashing the received blockchain address to authenticate a signature.

Figure 2:
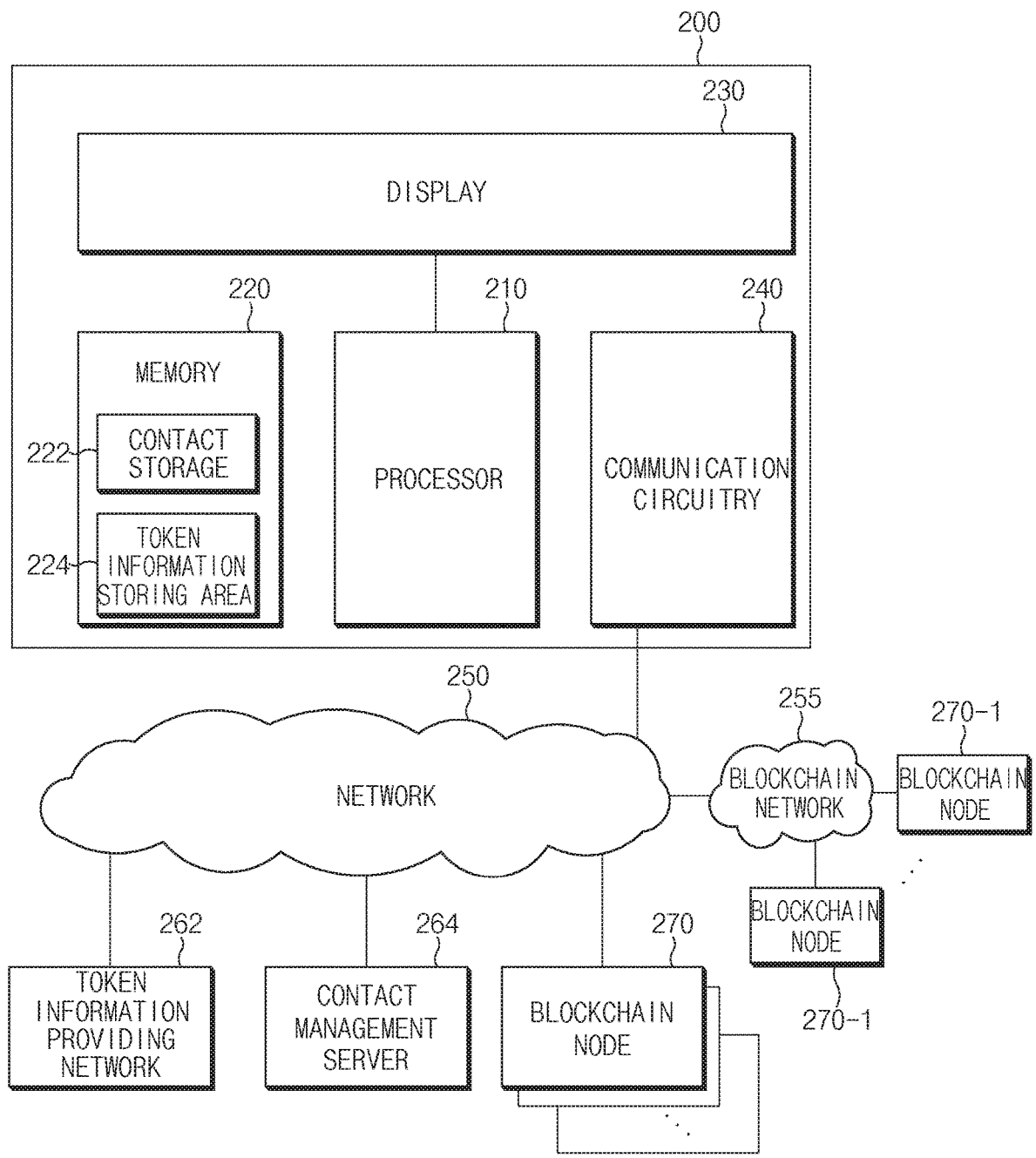
FIG. 2 is a block diagram illustrating a configuration of an electronic device according to an embodiment of the disclosure.

FIG. 2 is a block diagram illustrating a configuration of an electronic device according to an embodiment of the disclosure.

Referring to FIG. 2, an electronic device 200 (e.g., an electronic device 101 of FIG. 1) may include a processor 210 (e.g., a processor 120 of FIG. 1), a memory 220 (e.g., a memory 130 of FIG. 1), a display 230 (e.g., a display device 160 of FIG. 1), a communication circuitry 240 (e.g., a communication circuitry included in a communication module 190 of FIG. 1). According to an embodiment of the disclosure, the processor 210 may execute instructions stored in the memory 220. As a result of executing the instructions, the processor 210 may process data or may control a component of the electronic device 200 such that the electronic device 200 performs an operation.

According to an embodiment of the disclosure, the memory 220 may store first information. According to an embodiment of the disclosure, the first information may include information where the user of the electronic device 200 may specify information about a target of a blockchain transaction or information about a destination address upon a blockchain transaction. For example, the first information may include contact information (more specifically, contact information of a target of a blockchain transaction indicated by a first blockchain address). For example, the contact information may include a name, a phone number, or an e-mail address. According to an embodiment of the disclosure, the first information may be information packaged by combining several pieces of information. For example, the first information may include information about a relationship between the user of the electronic device 200 and the target of the blockchain transaction. More specifically, the first information may be configured in the form of "James/Friend" or "James/Colleague" using group information included in the contact information. The electronic device 200 may obtain information stored in a plurality of databases to combine several pieces of information to configure the information. According to an embodiment of the disclosure, the first information including the contact information may be stored in a contact storage 222. For example, the contact information may be information included in a database which stores a phone number of a target, which is used to make a call by a phone-related application run on the electronic device 200. According to an embodiment of the disclosure, various applications of the electronic device 200 may run using information stored in the contact storage 222. For example, an e-mail application capable of running on the electronic device 200 may transmit an e-mail using a user name and e-mail information included in the contact storage 222.

For example, the contact information may include information which is received at the electronic device 200 from the user using an input device (e.g., an input device 150 of FIG. 1). For another example, the contact information may include information which is obtained from a contact management server 264 interworking with the electronic device 200 over a network 250 by the electronic device 200 using the communication circuitry 240. For another example, the contact information may include information received from another electronic device (e.g., an electronic device 102 or an electronic device 104 of FIG. 1) using a contact sharing function.

For another example, the first information may include token information. According to an embodiment of the disclosure, the first information including the token information may be stored in a token information storing area 224 of the memory 220. The token information storing area 224 may refer to a space formed in the memory 220 to store token information. For example, the token information may include information indicating a type of a token to identify the token used for a token transaction, address information of a token program, which is received from the user using the input device (e.g., the input device 150 of FIG. 1) by the electronic device 200, and information of a token receiver. For another example, the token information may include information which is received from a token information providing network 262 over the network 250 by the electronic device 200 using the communication circuitry 240.

According to an embodiment of the disclosure, the processor 210 may associate and store a first blockchain address with the first information in the memory 220. Furthermore, the processor 210 may display the first blockchain address and the first information associated with the first blockchain address to the user on the display 230. For example, when the electronic device 200 tries to generate a blockchain transaction using the first blockchain address, the processor 210 may display a transaction record screen including the first blockchain address on the display 230. The electronic device 200 may output information for identifying how many transactions which use the first blockchain address are performed in the past, on the transaction record screen including the first blockchain address. The electronic device 200 may perform a digital signature for performing a transaction for the first blockchain address (e.g., sending cryptocurrency to the first blockchain address) in response to a user input to the transaction record screen. According to an embodiment of the disclosure, when there are no transaction records, the electronic device 200 may further perform an additional operation for identifying the first blockchain address to verify the validity of the address. According to an embodiment of the disclosure, the electronic device 200 may obtain information about the first blockchain address via an external server (e.g., a blockchain address authentication server). According to an embodiment of the disclosure, the information about the first blockchain address may include reliability information about the first blockchain address. For example, when the first blockchain address is a blockchain address of an authorized institution, it may include information about the authorized institution. According to an embodiment of the disclosure, when the first blockchain address is an address used by hackers, the external server may provide the electronic device 200 with the first blockchain address with information about it. In this case, the electronic device 200 may transmit the first blockchain address to the external server and may obtain additional information about the first blockchain address in response to the transmitted first blockchain address. The electronic device 200 may display the obtained additional information together with the first blockchain address.

The electronic device 200 may obtain the first blockchain address in various methods. For example, the electronic device 200 may capture an image of a QR code and may obtain the first blockchain address based on information obtained by decrypting the QR code. For another example, the electronic device 200 may read the first blockchain address or information (e.g., a uniform resource locator (URL)) for obtaining the first blockchain address from a near field communication (NFC) tag through NFC. The electronic device 200 may obtain the first blockchain address and may perform an authentication process for additional authentication (e.g., a personal identification number (PIN) or biometric authentication) to perform a digital signature for the first blockchain address. For example, the authentication process using the biometric authentication may include an operation where the electronic device 200 obtains biometric information (e.g., a fingerprint or an iris) of the user and performs authentication based on the obtained biometric information. According to an embodiment of the disclosure, when the digital signature for the first blockchain address is completed, the electronic device 200 may output additional information (e.g., a trusted mark or a sound) indicating that the user is authenticated when displaying the first blockchain address. For example, the electronic device 200 may display an image indicating that the user is authenticated on the display 230. According to an embodiment of the disclosure, the electronic device 200 may differently display another image depending on whether the first blockchain address is authenticated. For example, when the first blockchain address is not authenticated, the electronic device 200 may display a red icon. When the first blockchain address is authenticated, the electronic device 200 may display a green icon. According to an embodiment of the disclosure, the electronic device 200 may display a different image to the user depending on whether the first blockchain address is authenticated or a level of reliability.

For example, when the first information includes a user name, the processor 210 may display a transaction record screen including the first blockchain address on the display 230 such that the electronic device 200 performs a digital signature for a blockchain transaction. According to an embodiment of the disclosure, the processor 210 may determine reliability associated with the first blockchain address and the first information. According to an embodiment of the disclosure, the processor 210 may output second information indicating the determined reliability on the display 230. According to an embodiment of the disclosure, the second information may be output in various forms (e.g., graphic information, audio information, video information, vibration information, or the like). For example, when the second information includes an icon corresponding to reliability, which is graphic information, the processor 210 may display the icon on the display 230. For example, the processor 210 may display a first icon when the reliability of the first blockchain address is high and may display a second icon when the reliability of the first blockchain address is low.

The processor 210 may digitally sign blockchain transaction data based on an input by the authenticated user. The communication circuitry 240 may transmit the blockchain transaction data digitally signed by the processor 210 to a blockchain network 255 over the network 250. The blockchain transaction data transmitted to the blockchain network may be authenticated by at least one blockchain node 270. The authenticated transaction data may be recorded in the at least one blockchain node 270 included in a block.

According to an embodiment of the disclosure, a blockchain system may include the blockchain network 255 separately established according to a blockchain platform. For example, the blockchain system configured based on a private blockchain platform, such as Ripple or Hyper Ledger may include a blockchain network established independently. The blockchain network 255 may verify a transaction for only an authenticated device and may configure blockchain nodes 270-1 capable of generating/storing a block.

Figure 3:
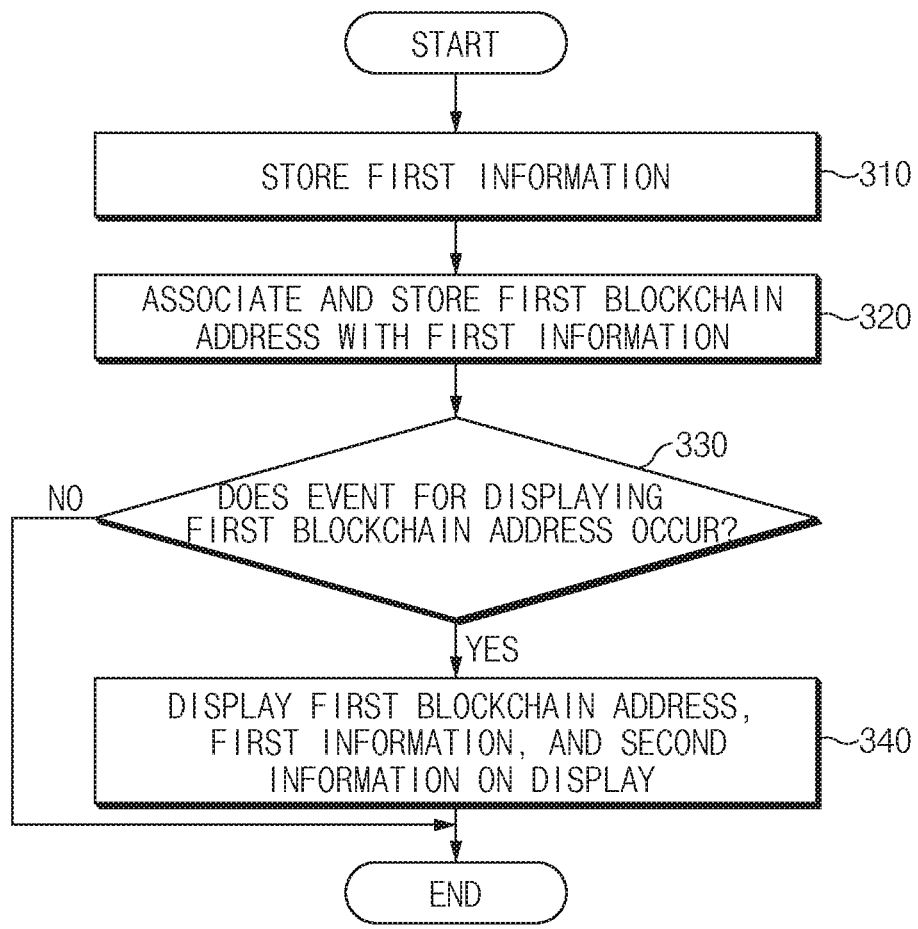
FIG. 3 is a flowchart illustrating a process where an electronic device displays a blockchain address according to an embodiment of the disclosure.

FIG. 3 is a flowchart 300 illustrating a process where an electronic device displays a blockchain address according to an embodiment of the disclosure.

Referring to FIG. 3, in operation 310, an electronic device 200 (e.g., a processor 210 of FIG. 2) may store first information. For example, the electronic device 200 may run an application capable of managing contacts and may store information input using an input device (e.g., an input device 150 of FIG. 1) by a user who uses the application. For example, the application capable of managing the contacts may be an address book application. The electronic device 200 may receive information, such as phone numbers, e-mail addresses, or names of users who want to make a call, as the first information in a call application. The electronic device 200 may store a database constructed with the received first information in a memory 220 of FIG. 2. For another example, the electronic device 200 may store contact information obtained from a contact management server 264 interworking with the electronic device 200 over a network 250 using the communication circuitry 240. For another example, the electronic device 200 may store information received from another electronic device (e.g., an external electronic device 102 or an external electronic device 104 of FIG. 1) using a contact sharing function. For another example, the electronic device 200 may store information obtained from a token information providing network 262 of FIG. 2.

In operation 320, the electronic device (e.g., the processor 210) may associate and store a first blockchain address with the first information. According to an embodiment of the disclosure, in operation 320, the electronic device may perform a user authentication process for verifying whether the user is an authorized user. Furthermore, in operation 320, the electronic device may perform an operation of providing the authenticated user with the first blockchain address and the first information and receiving an approval command to associate and store the first blockchain address with the first information from the user. The electronic device may generate a database in which the first blockchain address is mapped to the first information. The electronic device may manage the database which stores the first blockchain address and the first information together. The electronic device may store the first blockchain address and the first information based on an input of the user. For example, when identifying the first blockchain address and receiving an input approving to map the first blockchain address to the first information, the electronic device may perform an association operation of associating the first blockchain address with the first information. According to an embodiment of the disclosure, the electronic device may verify validity of the first blockchain address. The electronic device may map the first blockchain address verified as being valid to the first information. According to an embodiment of the disclosure, the electronic device may obtain information additionally needed to map the first blockchain address to the first information from the inside or outside of the electronic device. The electronic device may perform an operation of mapping the first blockchain address to the first information based on the result of analyzing the obtained information.

In operation 330, the electronic device (e.g., the processor 210) may identify whether an event for displaying the first blockchain address occurs. For example, the electronic device may receive a user input selecting the first blockchain address to generate a transaction for transmitting cryptocurrency. In this case, the electronic device may determine that an event for displaying the first blockchain address which is a destination address to receive cryptocurrency occurs.

In operation 340, the electronic device may display the first blockchain address, the first information, and second information on a display (e.g., a display 230 of FIG. 2). The event for displaying the first blockchain address may be, for example, that the first blockchain address of a receiver who may receive cryptocurrency is input to a blockchain transaction record input screen, when generating a transaction for sending cryptocurrency of the blockchain system.

FIG. 4 is a drawing illustrating a blockchain transaction confirmation screen 400 displaying a blockchain address, first information, and second information, according to an embodiment of the disclosure.

Referring to FIG. 4, an electronic device may display the blockchain transaction confirmation screen 400 including a blockchain address 410, first information 411, and second information 412.

According to an embodiment of the disclosure, the second information may be information indicating reliability for a first blockchain address or the first information. For example, when the first blockchain address is a blockchain address where a user previously generates a transaction, the electronic device may determine the first blockchain address as a reliable address and may display the first information corresponding to the determined reliability. For example, when the first blockchain address is authenticated by a reliable external device, the electronic device may display the second information corresponding to the reliability of the first blockchain address according to the authenticated result. According to an embodiment of the disclosure, the second information may indicate reliability information according to an entity which authenticates the first blockchain address. For example, the second information may be determined based on whether the electronic device authenticates the first blockchain address by the user or whether the first blockchain address is authenticated by means of an external device. According to an embodiment of the disclosure, when the first blockchain address is not valid, the electronic device may output the second information including a graphic indication indicating that the first blockchain address is not reliable. For example, when determining that the first blockchain address is a blockchain address manipulated by a hacker or when obtaining information indicating that the first blockchain address is an address of a hacker from the outside, the electronic device may determine that the first blockchain address is not a valid address. The electronic device may output a graphic indication indicating that the first blockchain address is not reliable.

For example, the second information may include information indicating that reliability has a level where it is authenticated from the user that the first blockchain address is associated with the first information, information indicating that reliability has a level predicted as that of a target associated with the user (e.g., that the first blockchain address is included in a transaction history of the user), or information indicating that the first blockchain address is not associated with reliable information. According to an embodiment of the disclosure, the second information may be output in the form of a graphic image. According to another embodiment of the disclosure, the second information may be output in the form of a sound via a speaker. According to another embodiment of the disclosure, the electronic device may provide the second information to a second electronic device connected with the electronic device. For example, the second information may be transmitted to another smart watch (the second electronic device) of the user connected with a portable mobile (a first electronic device). According to an embodiment of the disclosure, the electronic device may transmit reliability information about a first blockchain to an external server or at least one external blockchain network.

Figure 5:
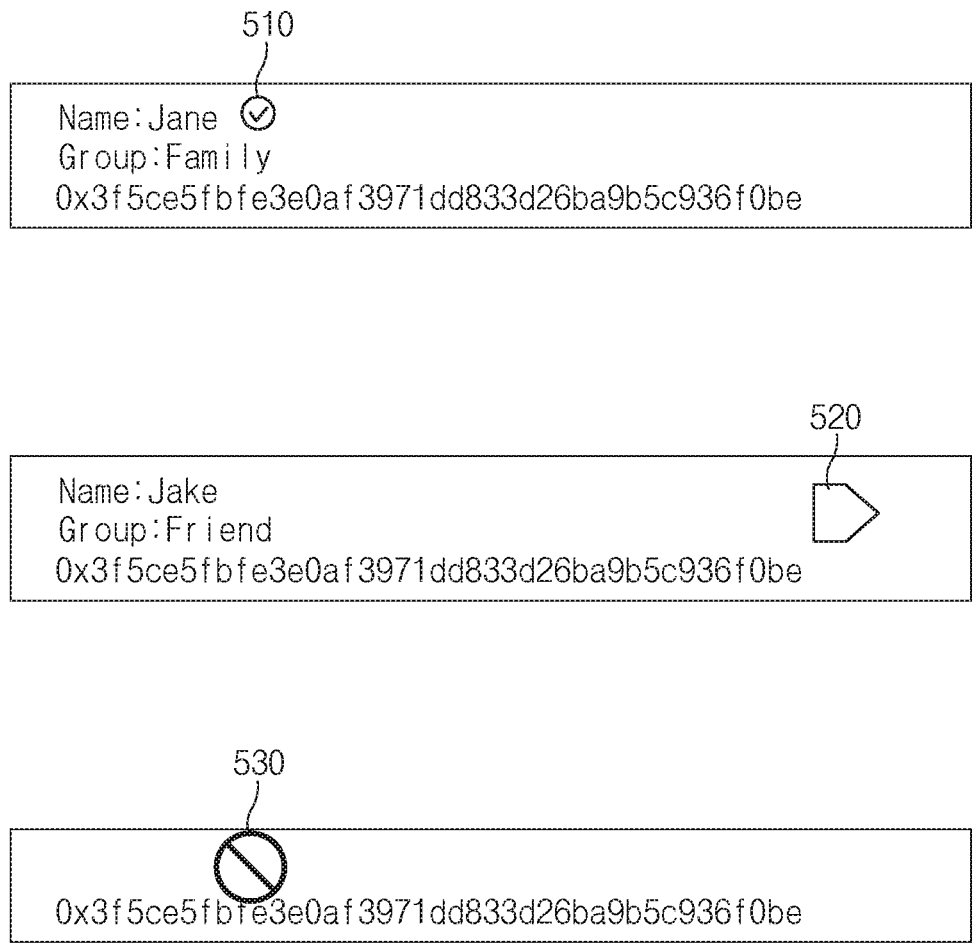
FIG. 5 is a drawing illustrating an electronic device displaying information about reliability according to an embodiment of the disclosure.

FIG. 5 is a drawing illustrating second information displayed together with a blockchain address according to an embodiment of the disclosure.

Referring to FIG. 5, an electronic device may display various types of second information about a first blockchain address. According to an embodiment of the disclosure, for a first case where the authentication of a user is completed with respect to a mapping relationship between the first blockchain address and first information (e.g., when signature data associated and stored with at least one of the first blockchain address and the first information is valid), the electronic device may display a first image (e.g., an icon 510) indicating high reliability. According to an embodiment of the disclosure, when the authentication of the user is not completed with respect to the first blockchain address, the electronic device may display an icon indicating that the authentication of the user is not completed. According to an embodiment of the disclosure, when the user maps the first blockchain address to the first information, the electronic device may display the icon 510 indicating high reliability.

For another example, referring to FIG. 5, when there is a normal blockchain transaction history for the first blockchain address (e.g., a second case), the electronic device may display a second image (e.g., an icon 520) indicating that the first blockchain address has reliability of a middle level in a connection with the first information. For another example, referring to FIG. 5, when a category of a contact, including the first blockchain address, which is stored in a contact storage (e.g., a contact storage 222 of FIG. 2), meets a specified condition (e.g., for a contact which belongs to a family category), the electronic device may display the icon 520 indicating that the first blockchain address has the reliability of the middle level in the connection with the first information. Alternatively, when the first information mapped to the first blockchain address is not verified or when it is unable to ensure reliability for the first blockchain, the electronic device may display a third image (e.g., an icon 530 indicating that the first blockchain address is an address which is not identified).

Figure 6:
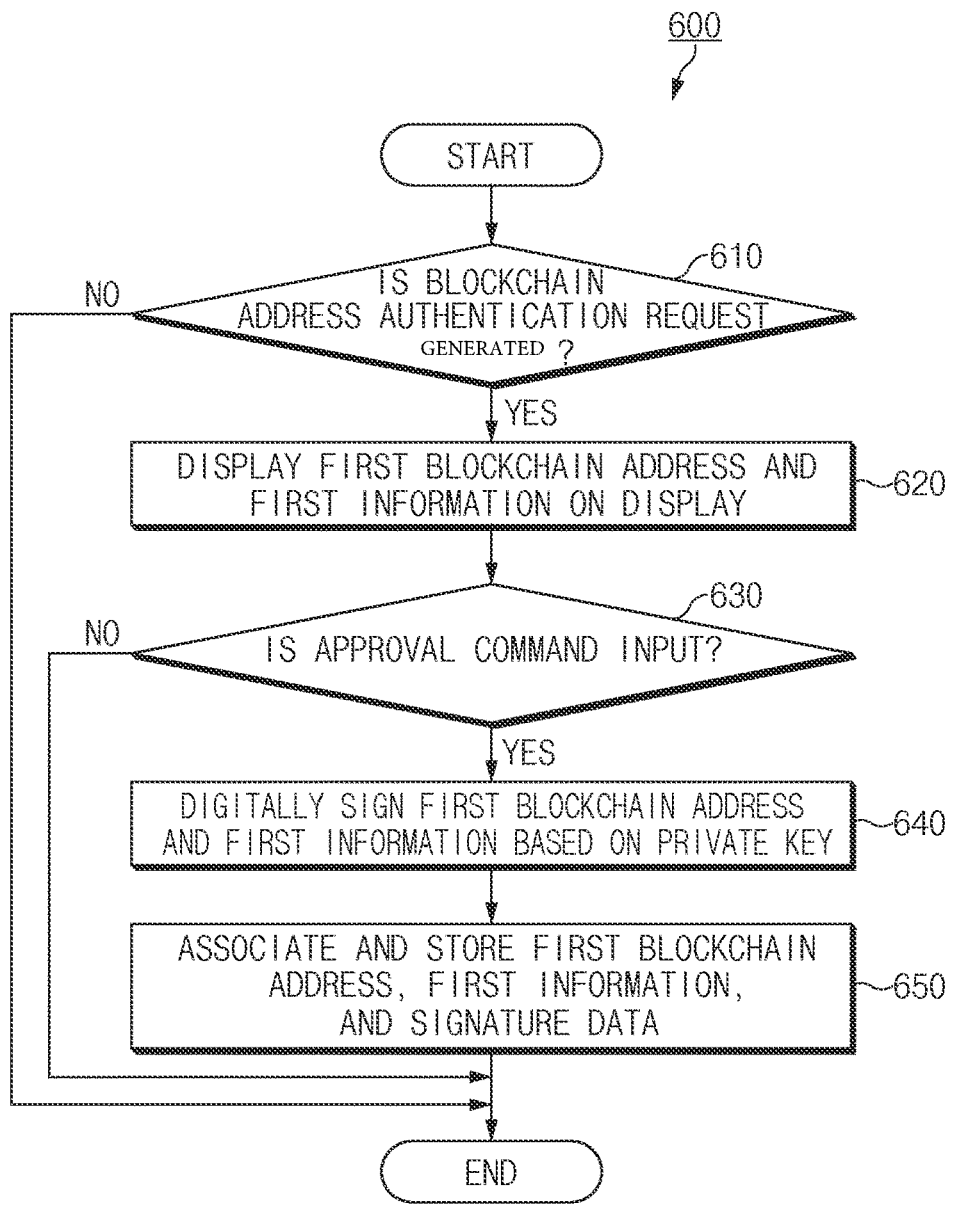
FIG. 6 is a flowchart illustrating a process where an electronic device associates and stores a blockchain address with first information according to an embodiment of the disclosure.

FIG. 6 is a flowchart 600 illustrating a process where an electronic device associates and stores a blockchain address with first information according to an embodiment of the disclosure.

Referring to FIG. 6, in operation 610, an electronic device (e.g., a processor 210) may identify whether a blockchain address authentication request for a first blockchain address is generated.

When the address authentication request is generated in operation 610, in operation 620, the electronic device (e.g., the processor 210) may display the first blockchain address and first information to be associated and stored with the first blockchain address on a display (e.g., a display 230 of FIG. 2). The blockchain address authentication request may mean that it is authenticated from a user whether there is a connection between the first blockchain address and the first information. The blockchain address authentication request may be implemented in various manners according to an embodiment. Contents about various embodiments will be described with reference to FIGS. 7 to 9.

When the address authentication request is generated, in operation 620, the electronic device (e.g., the processor 210) may display the first blockchain address and the first information. According to an embodiment of the disclosure, when the first information includes a token name and a token symbol (token information), the electronic device may display a screen including the token name, the token symbol, a blockchain address, and a user interface object.

In operation 630, the electronic device may receive an approval command through the user interface object from the user who identifies contact information and the blockchain address. According to an embodiment of the disclosure, the approval command may indicate that the user authenticates that the blockchain address and the first information are mapped to each other and may refer to a user input requesting to associate and store the blockchain address with the first information.

In operation 630 of FIG. 6, the electronic device may receive an approval command through the user interface object from the user who identifies the token name, the token symbol, the blockchain address. The token may refer to an object to be a transaction target between users of a blockchain system, which is issued based on the blockchain system.

According to an embodiment of the disclosure, the electronic device may execute a user authentication process of verifying the user which inputs the approval command. For example, the electronic device may execute the user authentication process after the approval command is input in operation 630 of FIG. 6. Herein, embodiments are not limited thereto. Herein, the user authentication process may be performed prior to any one of the operations shown in FIG. 6. When it is not authenticated that the user is an authorized user of the electronic device as a result of executing the user authentication process, the electronic device may fail to proceed with the process shown in FIG. 6 or may stop the process shown in FIG. 6.

As an example of the user authentication process, the electronic device may receive a personal identification number (PIN) from the user.

As an example of the user authentication process, the electronic device may include an operation of receiving biometric information (e.g., a fingerprint or an iris) from the user and authenticating the biometric information as the user authentication process.

According to an embodiment of the disclosure, operations of displaying information to the user in response to the approval command and obtaining a user input for the approval command may be performed by a screen or instructions by means of a separate trusted operating system or a separate trusted kernel in the electronic device.

According to an embodiment of the disclosure, when the approval command is input, in operation 640 of FIG. 6, the electronic device may perform a digital signature for the first blockchain address and the first information based on a private key. In the specification, a key pair including a private key and a public key may refer to a key pair generated based on a blockchain root seed. For example, the electronic device may generate signature data through a digital signature based on a private key with respect to a value obtained by combining the first blockchain address with the first information.

A blockchain address (e.g., a blockchain account address) used for a blockchain transaction may be generated based on a private key of each of parties for the blockchain transaction and a public key corresponding to the private key. For example, many cryptocurrencies based on a blockchain derive a private key and a public key for identifying a cryptocurrency account from a root seed. The electronic device may generate a private key and a public key using an algorithm based on bitcoin improvement proposal (BIP)-32 standards. For example, in the BIP-32 standards, a private key and a public key derived from the same root seed may be always generated in the same manner BIP-44 standards define a scheme implementing the BIP-32 standards and propose a 5-level hierarchical deterministic (HD) path as a method of deriving and obtaining a private key and a public key from a root seed. When the same HD path is used with the same root seed, all public keys may theoretically derived or obtained. Implementing the above-mentioned technology and identifying a cryptocurrency account is call an HD wallet. For example, the wallet may be classified as a nondeterministic wallet or a deterministic wallet. HD wallets have been developed to generate various keys in a single seed. The HD wallet has keys generated as a tree structure. The HD wallet may generate a child key from a parent key in the tree structure and may generate a grandchild key from the child key. A key may be theoretically generated without limit in such a manner A plurality of keys may be generated using the HD wallet, and various blockchain addresses may be managed and used. The root seed is a default value capable of generating many keys and addresses from one. The electronic device may recover keys which belong to the entire HD wallet. The electronic device may generate the root seed using a mnemonic word sequence. For example, to generate the root seed, the electronic device may generate a master private key and a master chain code from a hash value generated through an HMAC-SHA512 function. The electronic device according to an embodiment may use 256 bits at the left of a 512-bit hashed value as a private key and may use 256 bits at the right of the 512-bit hashed value as a chain code. The electronic device may obtain a public key from a private key using an elliptic curve function. The electronic device may generate a private key and a public key using the root seed and may generate a blockchain address using the public key. Because it is difficult to theoretically duplicate and generate the blockchain address, an individual may uniquely use the blockchain address.

In operation 650 of FIG. 6, the electronic device (e.g., the processor 210) may associate and store at least one of the first blockchain address and the first information with signature data. According to an embodiment of the disclosure, the operation of associating and storing the first blockchain address and the first information with the signature data may include an operation of storing the first blockchain address, the first information, or the signature data in a memory area or a trusted memory area included in the electronic device in the form of a table included in a database. According to an embodiment of the disclosure, when accessing the first blockchain address, the first information, or the signature data, the electronic device may obtain information through the database.

Figure 7:
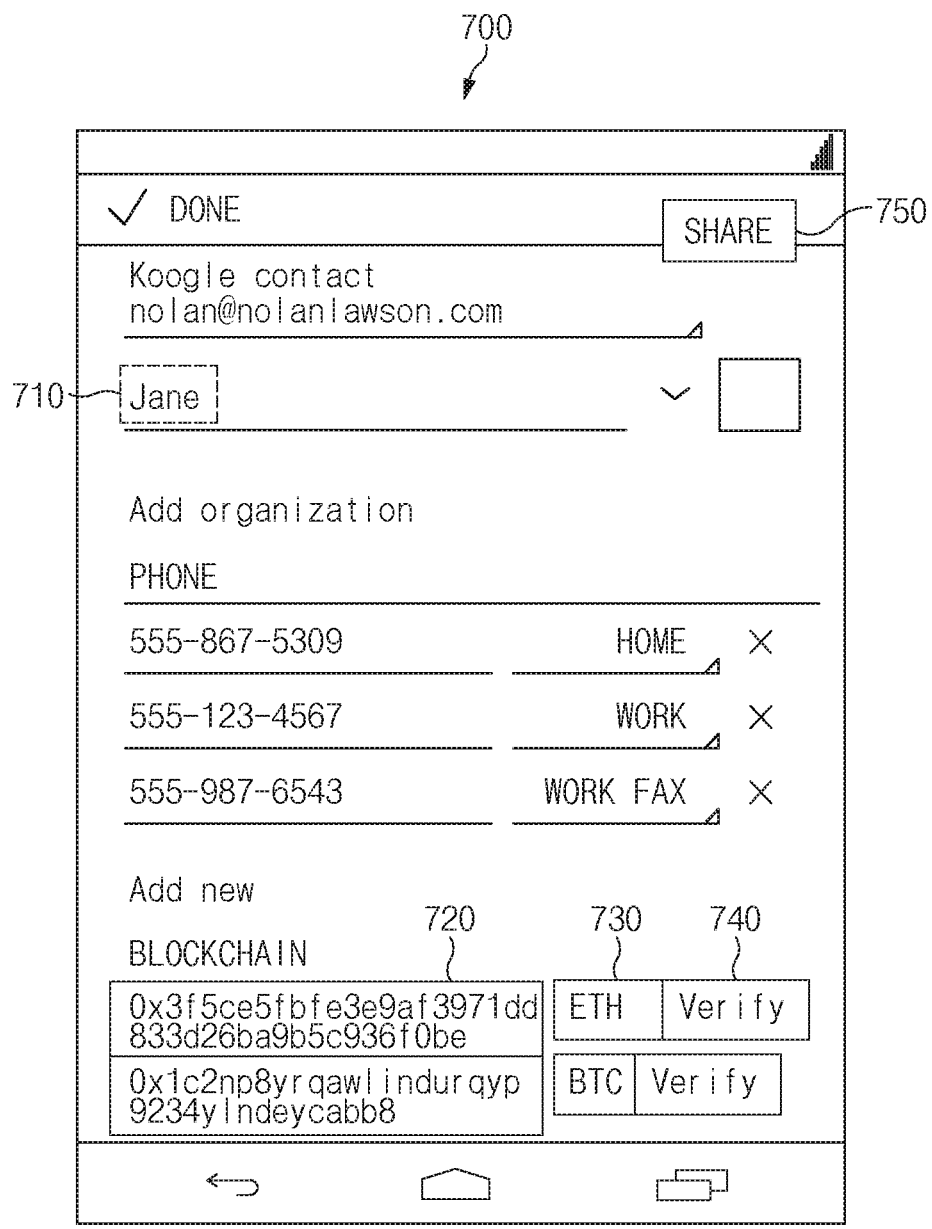
FIG. 7 is a drawing illustrating a screen where a contact application displayed on an electronic device is running according to an embodiment of the disclosure.

FIG. 7 is a drawing illustrating a screen for requesting a user to authenticate a blockchain address according to an embodiment of the disclosure.

Referring to FIG. 7, an electronic device may receive a user input for a blockchain address authentication request from a user using a screen 700 where a contact application is running. According to an embodiment of the disclosure, the contact application is not limited to contacts, which may generally include an application capable of displaying a blockchain address or first information. For example, the screen 700 where the contact application is running may include first information 710 and a blockchain address 720. According to an embodiment of the disclosure, the screen 700 where the contact application is running may further include information 730 (e.g., cryptocurrency information) indicating a blockchain platform associated with the blockchain address 720, a verify button 740, and a share button for sharing with the outside of the electronic device. The information 730 indicating the blockchain platform may be information associated with a name (e.g., Ethereum, Bitcoin, or the like) of the blockchain platform depending on a type of a blockchain network on which a blockchain address will be used. For example, for Ethereum, a cryptocurrency unit ETH of Ethereum or an image associated with Ethereum (e.g., a mark symbolizing Ethereum) may be displayed.

When the user selects the verify button 740, the electronic device may perform a blockchain address authentication process for the first information 710 and the blockchain address 720. According to an embodiment of the disclosure, the blockchain address authentication process may include, for example, operations 620 to 650 of FIG. 6 or operations 1604 to 1614 of FIG. 16. Furthermore, when the share button 750 is selected by a user input, the electronic device may transmit at least some of the information included in the screen 700 where the contact application is running to another device (e.g., an external electronic device 102 or an external electronic device 104 of FIG. 1). According to an embodiment of the disclosure, the blockchain address authentication process may include an operation of transmitting blockchain address information to an external device (e.g., a blockchain address authentication server) and performing authentication by the external device. According to an embodiment of the disclosure, the blockchain address authentication process may include an operation of transmitting blockchain address information to an external electronic device outside the electronic device and performing authentication by the external electronic device.

Figure 8:
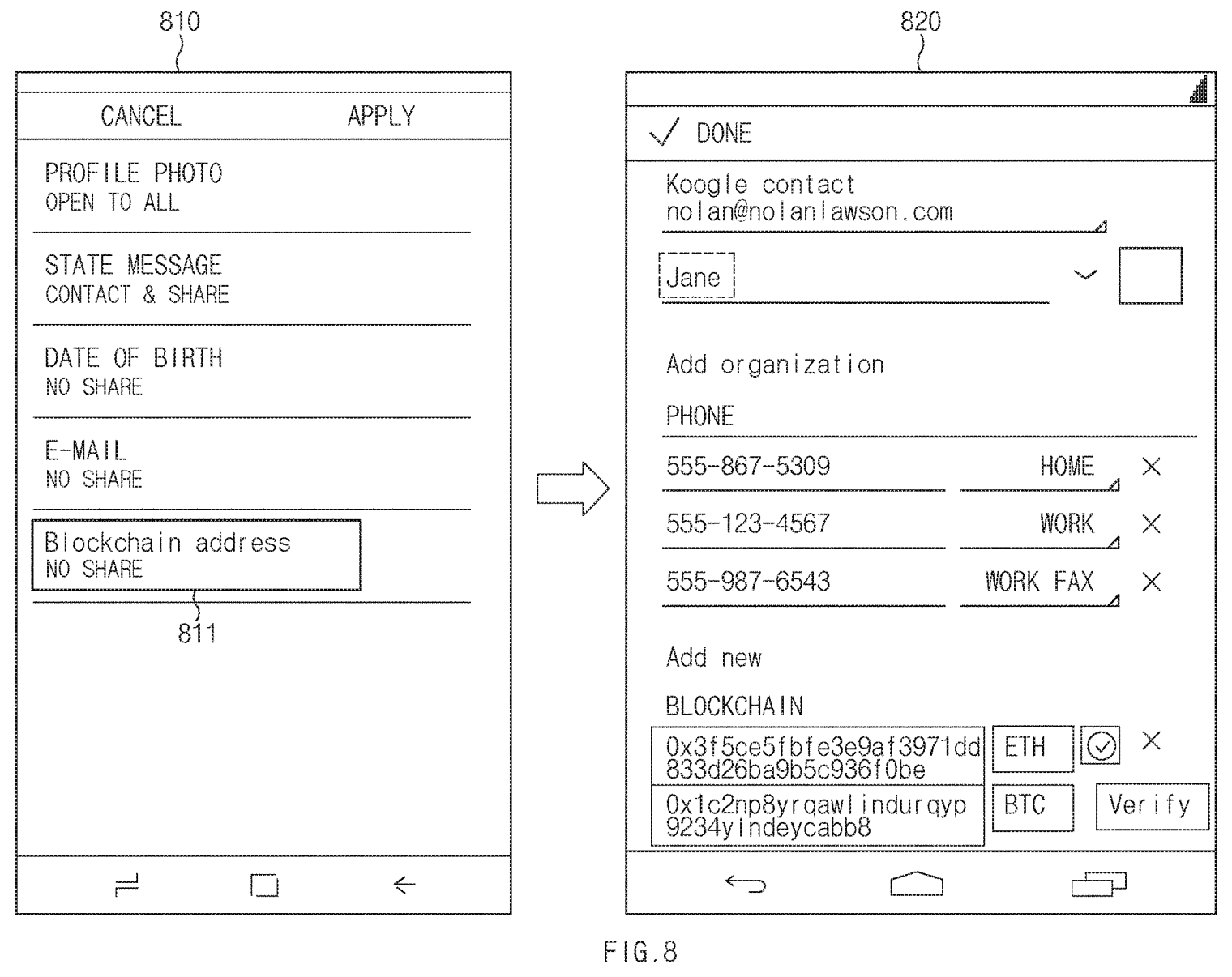

FIG. 8 is a drawing illustrating a screen for sharing a blockchain address according to an embodiment of the disclosure.

Referring to FIG. 8, an electronic device may display a contact sharing function setting list 810 including a blockchain address sharing setting item 811. When a contact sharing function is selected according to a user input to the blockchain address sharing setting item 811, the electronic device may determine whether to share a blockchain address. According to an embodiment of the disclosure, an electronic device, which receives a contact shared from an electronic device in which a blockchain address sharing function is enabled, may store a blockchain address together with contact information and may display a contact information screen 820 which displays the blockchain address together with the contact information. According to an embodiment of the disclosure, the electronic device may share information about the blockchain address with at least one contact displayed on the contact information screen 820 displayed to share the blockchain address. According to an embodiment of the disclosure, when sharing the information about the blockchain address, the electronic device may transmit the information about the blockchain address using a phone number, an e-mail, a MAC address, a message, NFC, or Bluetooth, which corresponds to a corresponding contact.

Figure 9:
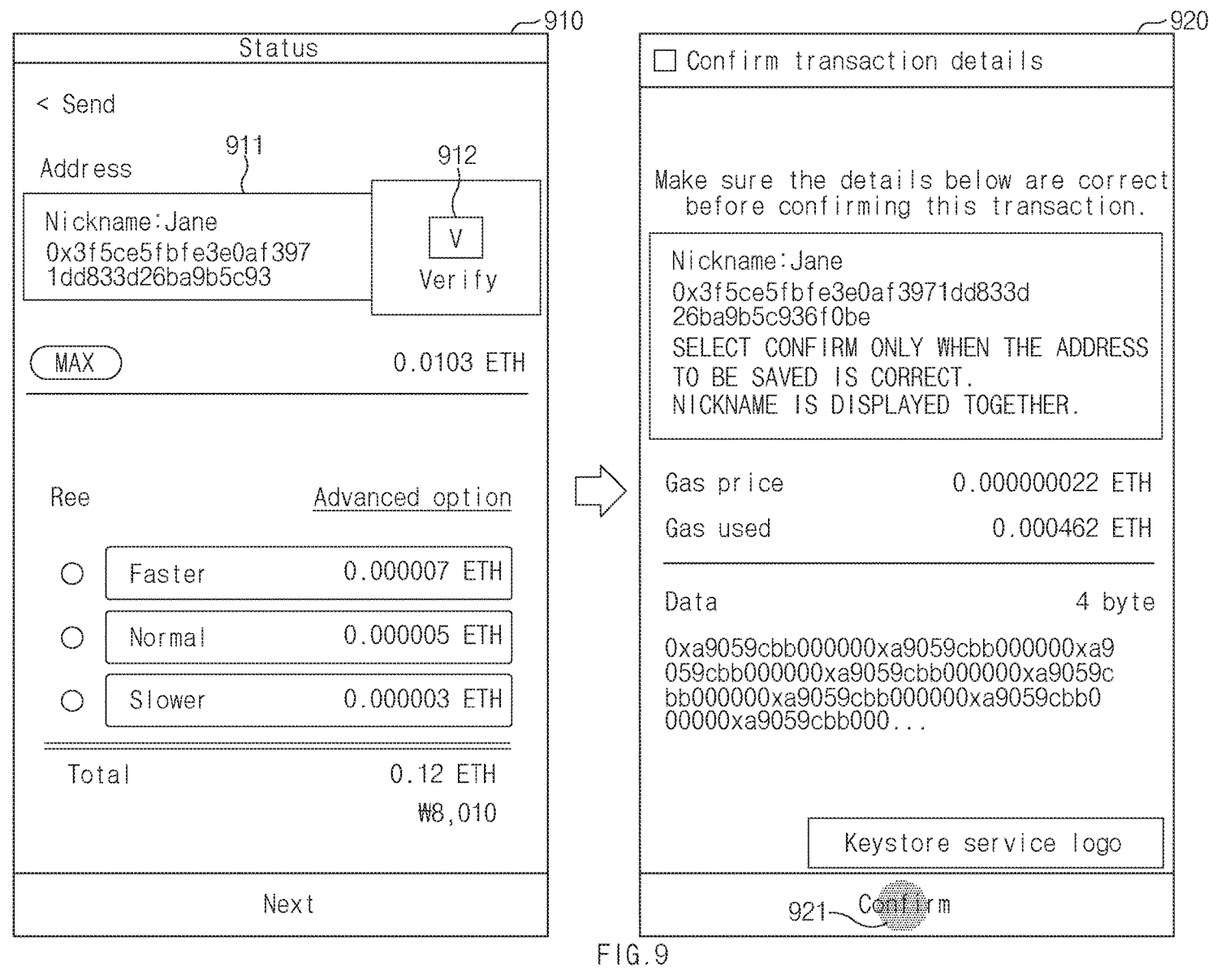

FIG. 9 is a drawing illustrating a screen for requesting to authenticate a blockchain address according to an embodiment of the disclosure.

Referring to FIG. 9, an electronic device may receive a blockchain address authentication request in a blockchain transaction process. For example, the electronic device may perform a transaction for transmitting certain cryptocurrency (e.g., 0.0103 Ethereum) to Nickname Jane using Ethereum. In this case, the electronic device may authenticate a blockchain address of Nickname Jane who receives cryptocurrency. According to an embodiment of the disclosure, the electronic device may display a transaction information input screen 910 for inputting information for generating a blockchain transaction. The electronic device may receive a blockchain address and first information 911 through the transaction information input screen 910. The transaction information input screen 910 may include a verify button 912. When the verify button 912 is selected by a user input, the electronic device may execute a process according to the blockchain address authentication request to display an information confirmation screen 920. According to an embodiment of the disclosure, the information confirmation screen 920 may be executed by a trusted user interface application executed in a trusted execution environment. The trusted execution environment may include, for example, a trusted operating system. To strengthen security, the trusted execution environment may include an environment which needs a separate operating system or function to access a separate trusted memory (e.g., a logical and physical trusted memory area (a trustzone)). The trusted execution environment may include an environment where the electronic device stores data which needs security in a memory physically divided or a memory area logically divided and limits to access the data through only a separate trusted operating system or function to access the data. When a confirm button 921 included in the information confirmation screen 920 is selected, the electronic device may associate and store the blockchain address with the first information.

According to an embodiment of the disclosure, the electronic device may identify validity associated with the blockchain address over a blockchain network. For example, when a user attempts to generate a transaction for a blockchain transaction or fetches a blockchain address list from a previous blockchain address book, the electronic device may obtain validity information about the blockchain address over the blockchain network. For example, when a separate application programming interface (API) for determining validity of the blockchain address is included in the blockchain network, the electronic device may request the blockchain network to determine the validity of the blockchain address through an API of a remote procedure call (RPC). The electronic device may analyze information obtained by the blockchain network (e.g., MAIN NET) and may provide the user with second or third information depending on the analyzed information. For example, the electronic device or an external server may collect information about a blockchain address over the blockchain network and may store the second or third information about the blockchain address based on the collected information. According to an embodiment of the disclosure, the blockchain network may store transaction information corresponding to the blockchain address and may provide the transaction information to a Java script object notation (JSON) RPC format API. A Java script code in a web application may deliver information on the web using JSON. When using a JSON object, the JSON object may include a number, a string, and sequence values. For example, a JSON RPC object may be used as an object where various applications based on Ethereum transmit and receive information. JSON may be an open standard format using text to deliver a data object, and RPC may include a protocol for data transmission and reception between peer to peer (P2P) networks. For example, Ethereum may perform a request and reception between Ethereum networks in a wallet based on JSON RPC. For example, for the Ethereum network, the electronic device may identify transaction contents corresponding to the blockchain address through an ethGetTransactionCount (block chain address, param) function. According to an embodiment of the disclosure, an operation where the electronic device authenticates the blockchain address may include an operation of providing additional information provided from a blockchain main net or an external server and providing the user with various user interfaces determined based on the additional information.

Figure 10:
FIG. 10 is a drawing illustrating an electronic device receiving a blockchain address authentication request based on a screen displaying a blockchain transaction history according to an embodiment of the disclosure.

FIG. 10 is a drawing illustrating a screen for mapping a blockchain address to contact information according to an embodiment of the disclosure.

Referring to FIG. 10, an electronic device may receive a blockchain address authentication request based on a transaction history screen 1010 which displays a blockchain transaction history. According to an embodiment of the disclosure, the electronic device may display a transaction history screen 1010 including a blockchain address 1011 and a verify button 1012. When an input selecting the verify button 1012 from a user who identifies the blockchain address 1011 on the transaction history screen 1010 is received, the electronic device may display a contact information list screen 1020 for selecting contact information to be associated and stored with the blockchain address 1011. The contact information list screen 1020 may include, for example, a list of contacts stored in a contact storage. Alternatively, for another example, the contact information list screen 1020 may include a contact list retrieved based on a keyword input to the electronic device. According to an embodiment of the disclosure, to configure the contact information list screen 1020, the electronic device may display contact information stored in the contact storage used by an application of the electronic device. According to an embodiment of the disclosure, the electronic device may filter information capable of being associated with a blockchain address among contact information stored in the contact storage and may output a contact list on which the filtered contact information is first displayed. According to an embodiment of the disclosure, when providing the contact information list screen 1020, the electronic device may obtain data associated with contact information from the outside to generate a contact information list. According to the embodiment shown in FIG. 10, the electronic device may receive a user input entering the keyword "Jane" to map the blockchain address to the contact information. The electronic device may output the result of retrieving the entered keyword "Jane" from information stored in the contact storage. When the contact information is selected on the contact information list screen 1020, the electronic device may perform a process according to the blockchain address authentication request.

Figure 11:
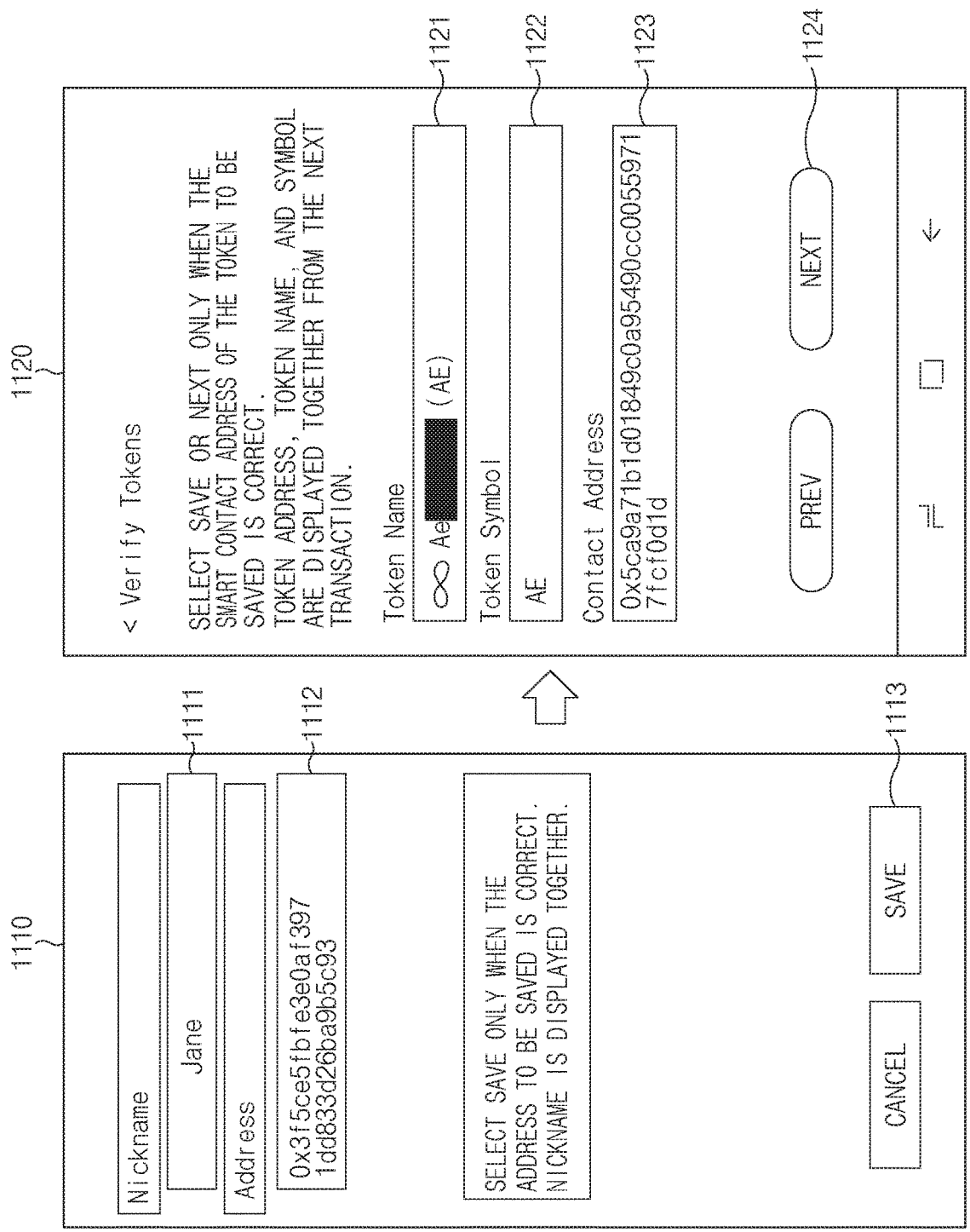
FIG. 11 is a drawing illustrating a screen where an electronic device displays a blockchain address and first information according to an embodiment of the disclosure.

FIG. 11 is a drawing illustrating a screen for mapping a blockchain address to token information according to an embodiment of the disclosure.

Referring to FIG. 11, an electronic device may display a screen 1110 including contact information 1111, a blockchain address 1112, and a user interface object 1113.

The electronic device may receive an approval command through the user interface object 1113 from a user who identifies contact information 1111 and the blockchain address 1112. According to an embodiment of the disclosure, the approval command may indicate that the user authenticates that the blockchain address and the first information are mapped to each other and may refer to a user input requesting to associate and store the blockchain address 1112 with the first information.

For another example, when the first information includes a token name 1121 and a token symbol 1122 (token information), the electronic device may display a screen 1120 including the token name 1121, the token symbol 1122, a smart contact address 1123, and a user interface object 1124. The electronic device may receive an approval command through the user interface object 1124 from the user who identifies the token name 1121, the token symbol 1122, and the blockchain address 1112.

FIG. 12 is a drawing illustrating a screen displayed such that a user authenticates a blockchain address according to an embodiment of the disclosure.

Referring to FIG. 12, the electronic device may display a first blockchain address and first information to a user and may receive an input approving to map two pieces of information. In this case, to receive the input approving to map the two pieces of information, the electronic device may output a message requesting approval and may authenticate a user using a personal identification number (PIN) or biometric authentication. For example, the electronic device may display a screen 1210 including a PIN input item 1211 for receiving a PIN. The electronic device may verify the user based on the entered PIN. For another example, the electronic device may receive biometric information (e.g., fingerprint information, iris information, or the like) from the user. According to an embodiment of the disclosure, the electronic device may display a screen 1220 including an object 1221 requesting to enter a fingerprint from the user. According to an embodiment of the disclosure, the electronic device may perform authentication through a fingerprint input of the user. When the authentication of the user is completed, the electronic device may associate and store blockchain information with first information.

Figure 13:
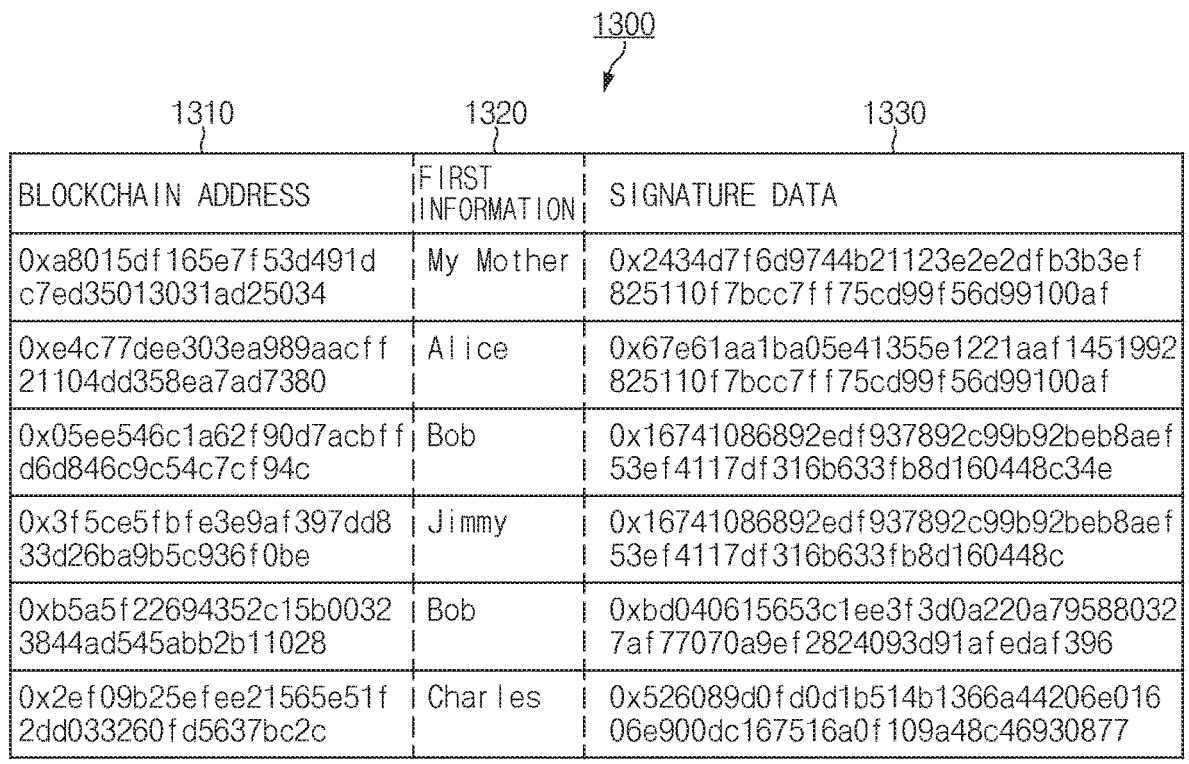
FIG. 13 is a drawing illustrating an electronic device associating and storing a blockchain address with another information according to an embodiment of the disclosure.

FIG. 13 is a drawing illustrating a mapping table 1300 which associates and stores a blockchain address with first information according to an embodiment of the disclosure.

Referring FIG. 13, the electronic device may associate and store at least one blockchain address 1310 with first information 1320 including at least one of contact information (e.g., nicknames of contacts) and signature data 1330 obtained by performing a signature using a private key of a user.

Figure 14:
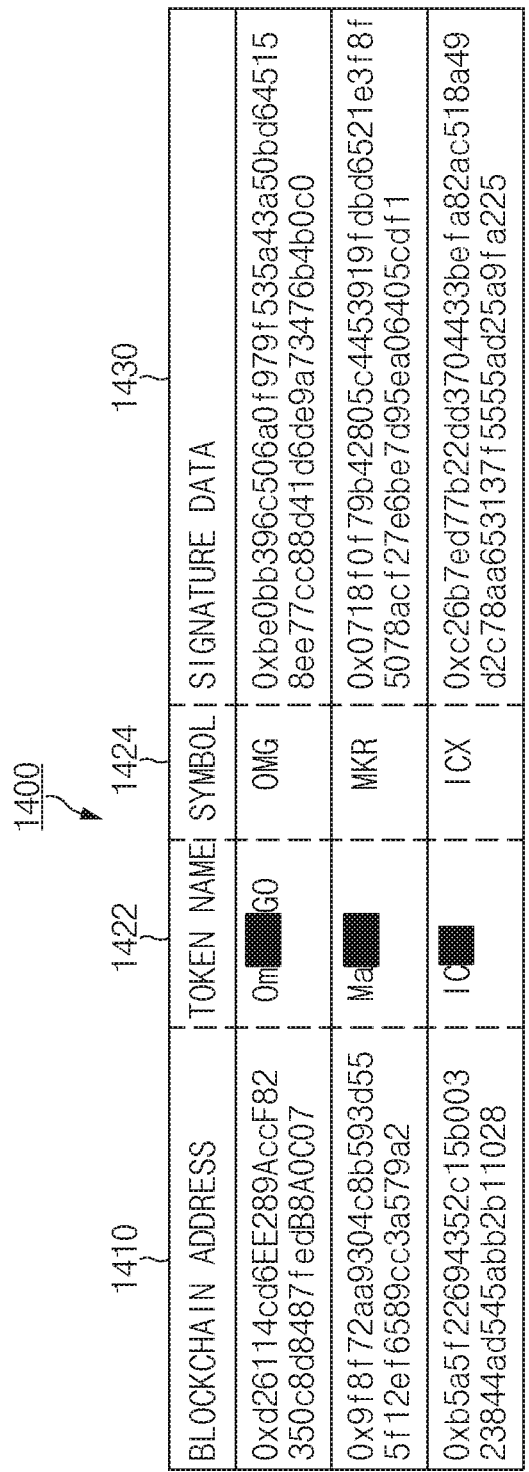
FIG. 14 is a drawing illustrating an electronic device storing a blockchain address in conjunction with another information according to an embodiment of the disclosure.

FIG. 14 is a drawing 1400 illustrating an electronic device associating and storing a blockchain address with another information according to an embodiment of the disclosure.

Referring to FIG. 14, the electronic device may associate and store a blockchain address 1410 with token information including a token name 1422 and a token symbol 1424 and signature data 1430.

Figure 15:
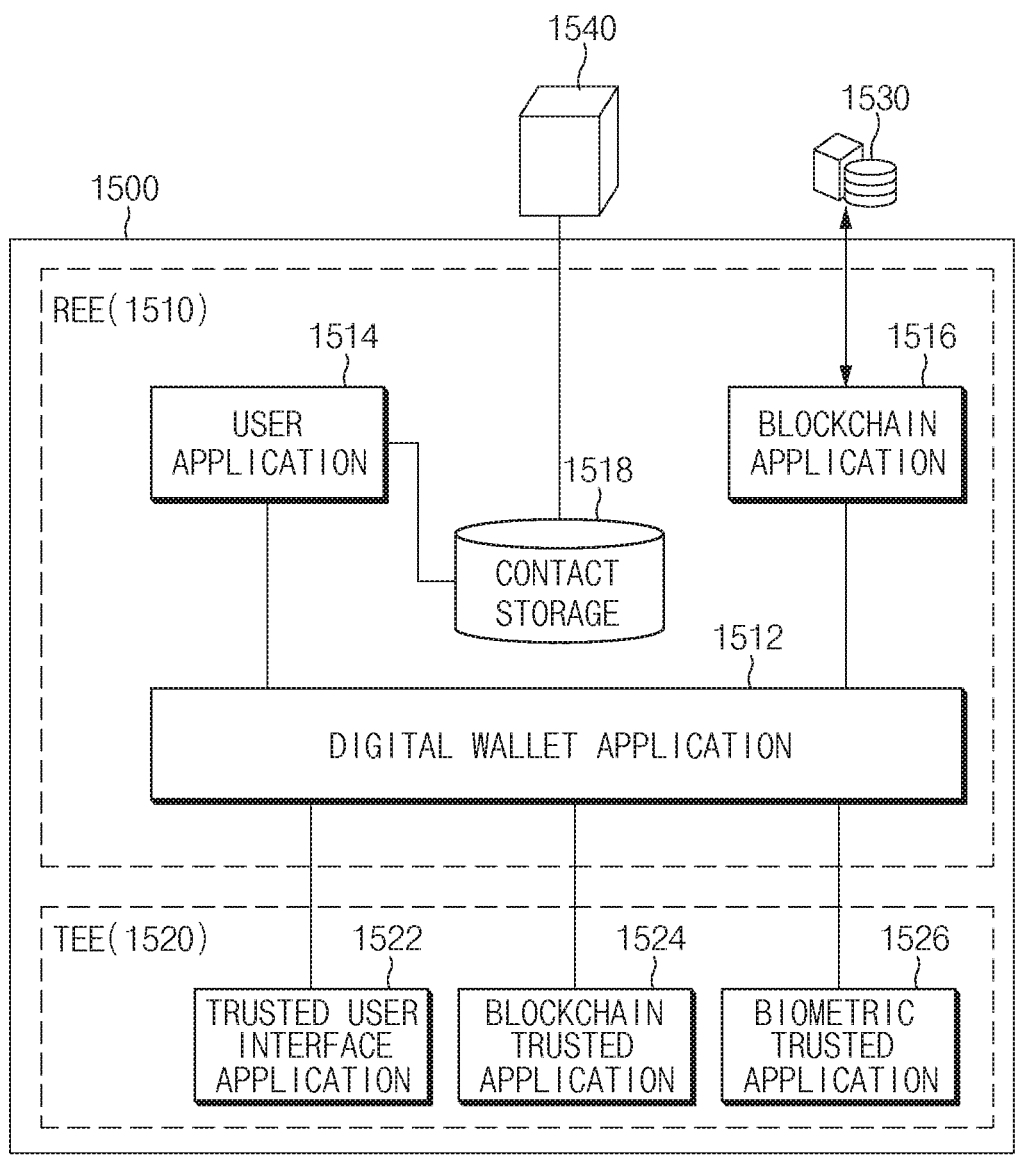
FIG. 15 is a block diagram illustrating a rich execution environment (REE) and a trusted execution environment (TEE) implemented by a rich operating system and a trusted operating system operated by an electronic device according to an embodiment of the disclosure.

FIG. 15 is a drawing illustrating a rich execution environment (REE) and a trusted execution environment (TEE) operated by an electronic device according to an embodiment of the disclosure.

Referring to FIG. 15, a memory of an electronic device 1500 may be virtually separated from the REE accessible by a rich user application run by an operating system generally included in the electronic device and may be separated from the TEE accessible by only a software module which is specially authorized. According to an embodiment of the disclosure, the software module which is specially authorized may be run in the TEE. According to an embodiment of the disclosure, the electronic device may control access to the TEE by a hardware-based security system. For example, the memory of the electronic device may include an area (the REE) typically accessible by the user and a trusted zone (the TEE) virtually implemented. According to an embodiment of the disclosure, a trusted kernel may be a kernel which is included in a rich operating system, but separately has strengthened security. The rich operating system may be implemented in such a manner as to deliver a message to the trusted kernel and deliver the result performed by the trusted kernel based on the delivered message to the rich operating system. According to an embodiment of the disclosure, to strengthen security, the trusted kernel is accessible by only a verified message or a permitted message. According to an embodiment of the disclosure, the trusted operating system or the trusted kernel may be an operating system, security of which is separately strengthened, which is different from the rich operating system.

The electronic device 1500 may operate an execution environment having a plurality of security levels for security.

The plurality of execution environments may include, for example, an REE 1510 and a TEE 1520. The REE 1510 may be a first execution environment having a first security level. The TEE 1520 may be a second execution environment having a second security level which is different (e.g., higher) from the first security level. According to another embodiment of the disclosure, the electronic device 1500 may include, but is not limited to, an additional another execution environment (e.g., a third execution environment) having a third security level.

The electronic device 1500 may divide and operate the operating system (OS) into the REE 1510 and the TEE 1520. The REE 1510 may be run by a rich OS (e.g., a non-secure OS). The TEE 1520 may be run by a trusted OS. For example, the rich OS may be Android™ OS. The trusted OS may be, for example, Teegris™, QSEE™, or Trustzone. The trusted OS may be independently separated from the rich OS and may run based on a separate resource to be configured as an environment an unauthorized program or application may not access.

According to an embodiment of the disclosure, the electronic device 1500 in the TEE 1520 may encrypt data based on a trusted application (TA) run based on the trusted OS. According to an embodiment of the disclosure, the electronic device 1500 in the TEE 1520 may perform encryption using a separate trusted memory area (e.g., a secure element (SE), an eSE, or an eSIM) space separated from an untrusted memory area to store the encrypted information and may allow the rich OS and a rich application (e.g., a digital wallet application 1512 or a user application (e.g., a contact management application, a financial application, a social networking application, a message application, an e-mail application, or the like)) 1514, or a blockchain application 1516) run on the rich OS not to directly access the TEE 1520 to securely protect data. The electronic device 1500 in the TEE 1520 may not directly encrypt and decrypt data stored in the TEE 1520 by an application run on the REE 1510. According to an embodiment of the disclosure, the right to access data stored in the TEE 1520 may be allowed by only a separate authorized application run on the TEE 1520.

The electronic device 1500 may store data requiring a relatively high security level in the safe TEE 1520 and may perform an operation associated with the data. According to an embodiment of the disclosure, the TEE 1520 may operate based on the rich OS run on an application processor (e.g., a processor 120 of FIG. 1 or a processor 210 of FIG. 2) provided in the electronic device 1500, which operate based on a reliable hardware structure determined in the process of manufacturing the electronic device 1500. For example, the electronic device may generate a device unique hardware key (DUHK) in the stage of manufacturing the electronic device using a hardware random number generator. When binding data to a specific device based on a unique hardware key, the electronic device may allow only a hardware encryption module to access the electronic device. Thus, the security of the electronic device may be strengthened. According to an embodiment of the disclosure, the electronic device may use a hardware key in only the TEE, security of which is strengthened. According to an embodiment of the disclosure, trusted software specially authorized, which is run on the TEE of the electronic device, may store data in the TEE using the hardware key.

According to another embodiment of the disclosure, the TEE 1520 may be a memory area accessible by the trusted OS run by the application processor of the electronic device 1500. Software or hardware needing security may operate through the TEE 1520. According to an embodiment of the disclosure, the electronic device 1500 may operate the TEE 1520 through a physical separation of hardware or logical separation of software. For example, the electronic device 1500 may configure the TEE 1520 using a separate hardware memory separated from an untrusted memory area.

According to an embodiment of the disclosure, the TEE 1520 may be separated from the REE 1510 through hardware constraints. According to an embodiment of the disclosure, when the REE 1510 and the TEE 1520 are separated from each other through the hardware constraints, the TEE 1520 may be constructed in a separate memory. According to an embodiment of the disclosure, the TEE 1520 may be a memory area implemented in at least a part of the processor. According to an embodiment of the disclosure, the TEE may be constructed in an external memory of the electronic device and may be configured to be accessible in the electronic device when electrically or operatively connected with the electronic device. According to an embodiment of the disclosure, the external memory may include at least a partial memory included in a SIM card electrically connectable to the electronic device. According to another embodiment TEE 1520 may be logically separated from the REE 1510 to operate on the same hardware (e.g., memory). According to an embodiment of the disclosure, the electronic device may logically classify at least a portion of a physical memory included in the electronic device as an untrusted zone (an REE) and may classify at least the other of the physical memory as a trusted zone (a TEE) to use the untrusted zone and the trusted zone.

At least one application (e.g., the digital wallet application 1512) run on the REE 1510 may deliver data or a message to software specially authorized, which is run on the TEE 1520, using an API permitted to access the TEE 1520 or may receive a response corresponding to the message.

According to an embodiment of the disclosure, the electronic device 1500 may run the digital wallet application 1512, the user application 1514, and the blockchain application 1516 in the REE 1510. Furthermore, the electronic device 1500 may run various software in the TEE 1520. For example, the electronic device 1500 may run a trusted user interface application 1522 and a blockchain trusted application 1524. Furthermore, the electronic device 1500 may have a storage (e.g., a contact storage 1518) accessible by an application run in the REE 1510.

According to an embodiment of the disclosure, the electronic device 1500 may store contact information in the contact storage 1518 configured using a portion (e.g., an REE) of a memory in the electronic device 1500. The contact storage 1518 may be a database configured in the electronic device 1500 based on information associated with contacts. Herein, the contact storage 1518 of FIG. 15 may be replaced with another database which stores data used by the user application 1514 of the electronic device 1500.

For example, the electronic device 1500 may run the user application 1514 to store contact information input from a user in the contact storage 1518. For another example, the contact information stored in the contact storage 1518 may be information synchronized with information stored in a contact server 1540. The contact server 1540 may be omitted.

According to an embodiment of the disclosure, the user application 1514 may be an address book application which manages contact information stored in the contact storage 1518. A contact management application may be implemented as various types of applications, such as a simple address book management application, an instant messenger, or a social media application.

According to an embodiment of the disclosure, the digital wallet application 1512 may manage a private key corresponding to a blockchain address of the user. Furthermore, the digital wallet application 1512 may manage a trusted application (e.g., a trusted user interface (TUI) application 1522 or a blockchain trusted application (TA) 1524) run on the TEE 1520.

The digital wallet application 1512 may receive a blockchain address authentication request. For example, the digital wallet application 1512 may receive a blockchain address authentication request for a blockchain address and first information displayed by the user application 1514. According to an embodiment of the disclosure, the digital wallet application 1512 may allow the user to identify the blockchain address and the first information and may allow the electronic device 1500 to display a screen for receiving an approval command to map the blockchain address to the first information (e.g., contact information). To display the blockchain address and the first information in an environment where security is maintained, the digital wallet application 1512 may display the blockchain address and the first information using the TUI application 1522. Furthermore, to securely receive a user input associated with the blockchain address and the first information, the electronic device 1500 may receive the user input through the TUI application 1522. For example, the electronic device 1500 may receive authentication information (e.g., a PIN, fingerprint information, or iris information) for authenticating the user through the TUI application 1522 to approve to map the blockchain address to the first information. Receiving an approval command for the blockchain address and the first information, the TUI application 1522 may deliver the approval command to the digital wallet application 1512.

Receiving the approval command, the digital wallet application 1512 may deliver a signature request for the blockchain address and the first information to the blockchain TA 1524. The blockchain TA 1524 may perform digital signature for the blockchain address and the first information based on a private key of the user. The blockchain TA 1524 may deliver signature data generated as a result of performing the digital signature to the digital wallet application 1512. Receiving the signature data, the digital wallet application 1512 may associate and store the first information, the blockchain address, and the signature data in the contact storage 1518 through the user application 1514.

The blockchain application 1516 may allow the electronic device 1500 to connect to a blockchain node 1530 establishing the blockchain network. Furthermore, the blockchain application 1516 may write blockchain transaction data to be transmitted to the blockchain network by the electronic device 1500. The blockchain application 1516 may deliver a signature request including the written blockchain transaction data to the digital wallet application 1512. The digital wallet application 1512 may obtain and/or parse raw data of a blockchain transaction from the signature request. The digital wallet application 1512 may display transaction records included in the blockchain transaction data through the TUI application 1522. Herein, the digital wallet application 1512 may retrieve information stored in the contact storage 1518 based on a second blockchain address (e.g., a blockchain address of a receiver) included in the blockchain transaction data. When there is a blockchain address (a first blockchain address) matched with a second blockchain address in a contact storage, the electronic device may transmit information (the first information, the second information, and the signature data) associated with the blockchain address to a TEE area to be displayed through the TUI application. Herein, the electronic device may identify whether the digital signature is valid using information received based on the TEE. For example, the electronic device may decrypt a value digitally signed by the user among the received information using a private key and may compare the decrypted value with the received first information and first blockchain address value to identify whether the digital signature is valid. According to an embodiment of the disclosure, when validity of the digital signature for information delivered from the REE to the TEE is verified using a private key stored in the TEE, the electronic device may provide the user with information (e.g., the first blockchain address, the first information, or the second information) received through the TUI application 1522 and transaction records included in blockchain transaction data. For example, when the second blockchain address included in the blockchain transaction data is identical to the first blockchain address, the digital wallet application 1512 may display the first information (e.g., "Jane") associated and stored with the first blockchain address through the TUI application 1522.

The TUI application 1522 may receive an additional input for approving a transaction from the user who identifies the displayed information. According to an embodiment of the disclosure, the TUI application 1522 may additionally perform biometric authentication by means of a biometric authentication (e.g., fingerprint authentication) trusted application 1526.

The TUI application 1522 may deliver an input approving a transaction to the digital wallet application 1512.

Receiving the input approving the transaction, the digital wallet application 1512 may deliver the second blockchain address, the blockchain transaction data, the first information retrieved based on the second blockchain address, and a signature request including signature data to the blockchain TA 1524. The blockchain TA 1524 may determine whether the first blockchain address and the second blockchain address are identical to each other. When the first blockchain address and the second blockchain address are not identical to each other, the blockchain TA 1524 may fail to perform digital signature. The blockchain TA 1524 may perform digital signature for the second blockchain address and the first information and may compare the result of performing the digital signature with signature data received from the digital signature application 1512. When the two data are not identical to each other as a result of the comparison, because there is a probability that data stored in the contact storage 1518 will be changed by an external attack, the blockchain TA 1524 may deliver an error message to the digital signature application 1512 without performing digital signature for blockchain transaction data. When the result of performing the digital signature for the second blockchain address and the first information is identical to signature data, the blockchain TA 1524 may perform digital signature for blockchain transaction data and may deliver the digitally signed blockchain transaction data to the digital signature application 1512. The digital wallet application 1512 may transmit the digitally signed data to the blockchain network through the blockchain application 1516 such that a transaction is performed.

According to another embodiment of the disclosure, when the first information associated and stored with the blockchain address includes token information, the user application 1514 of FIG. 15 may be replaced with a token information management application. In this case, the first information, the blockchain address, and the signature data may be stored in a token information storage area which stores token information of a memory (e.g., a memory 130 of FIG. 1).

Figure 16:
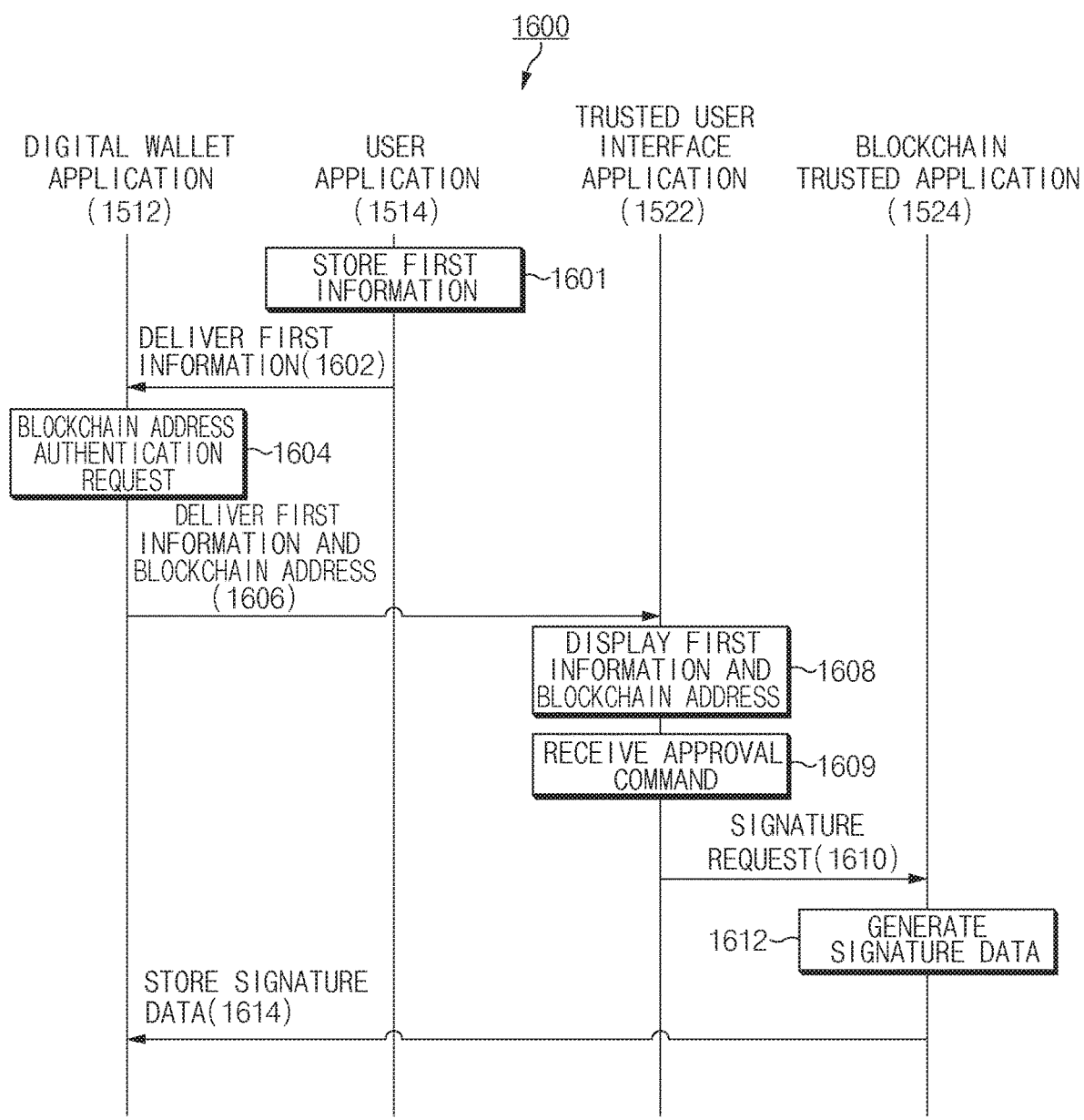
FIG. 16 is a signal sequence diagram illustrating a process where an electronic device associates and stores a blockchain address with signature data according to an embodiment of the disclosure.

FIG. 16 is a flowchart 1600 illustrating a process where an electronic device associates and stores a blockchain address with signature data, according to an embodiment of the disclosure.

Referring to FIG. 16, in operation 1601, an electronic device (e.g., a processor 120) may store first information by means of a contact management application. Furthermore, in operation 1602, a user application 1514 may deliver the first information to a digital wallet application 1512 depending on a request of the digital wallet application 1512. Furthermore, according to an embodiment of the disclosure, the digital wallet application 1512 may receive the first information together with a blockchain address in operation 1602. Alternatively, according to another embodiment of the disclosure, the digital wallet application 1512 may receive a blockchain address to be associated and stored with the first information through a screen where the digital wallet application 1512 is running According to another embodiment of the disclosure, when the digital wallet application 1512 has the right to access a contact storage 1518, it may directly obtain the first information.

In operation 1604, the digital wallet application 1512 may generate a blockchain address authentication request depending on a user input to the digital wallet application 1512 or may receive a blockchain address authentication request generated by another application (e.g., the user application 1514).

In response to the blockchain address authentication request, in operation 1606, the digital wallet application 1512 may deliver the first information and the blockchain address to a TUI application 1522. In operation 1608, the TUI application 1522 may display the first information and the blockchain address on a display. In operation 1609, the trusted user interface application 1522 may receive an approval command to map the first information to the blockchain address from a user. In response to the approval command, in operation 1610, the TUI application 1522 may deliver a signature request for the first information and the blockchain address to a blockchain TA 1524. According to an embodiment of the disclosure, the TUI application 1522 may deliver a signature request to the blockchain TA 1524 through the digital wallet application 1512. For example, the TUI application 1522 may deliver information or a message for the received approval command to the digital wallet application 1512 and may deliver a signature request for the blockchain address and the first information to the blockchain TA 1524.

In operation 1612, in response to the signature request, the blockchain TA 1524 may perform digital signature for the blockchain address and the first information based on a private key of the user to generate signature data. According to an embodiment of the disclosure, the blockchain TA 1524 may execute a user authentication process (e.g., biometric authentication) for authenticating the user before performing the digital signature. In operation 1614, the blockchain TA

1524 may deliver the generated signature data to the digital wallet application 1512 (or the user application 1514). Receiving the signature data, the digital wallet application 1512 may associate and store the signature data with the blockchain address and the first information. According to an embodiment of the disclosure, the digital wallet application 1512 may further store second information indicating reliability for a link between the blockchain address and the first information.

According to an embodiment of the disclosure, the blockchain TA 1524 may store at least one of the generated signature data, the blockchain address, or the first information in a memory area managed by an operating system (e.g., a second operating system or a trusted operating system) run by the blockchain TA 1524. According to an embodiment of the disclosure, the blockchain TA 1524 may store the second information indicating the reliability for the link between the blockchain address and the first information in a memory area (e.g., a TEE) managed by an operating system run by the blockchain TA 1524.

Figure 17:
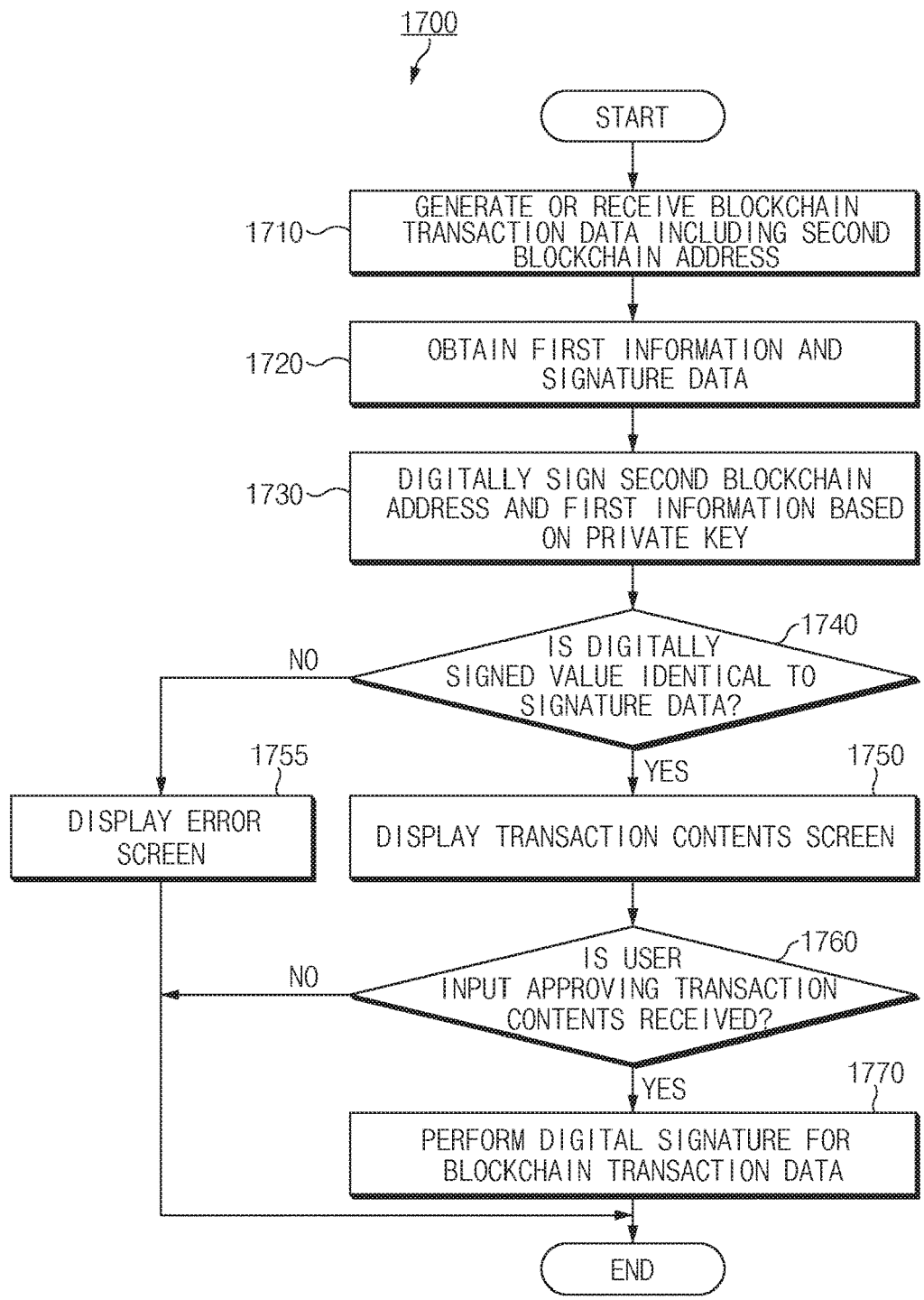
FIG. 17 is a flowchart illustrating a process where an electronic device performs a digital signature for blockchain transaction data according to an embodiment of the disclosure.

FIG. 17 is a flowchart 1700 illustrating a process where an electronic device performs a digital signature for blockchain transaction data, according to an embodiment of the disclosure.

Referring to FIG. 17, in operation 1710, an electronic device (e.g., a processor 120) may generate or receive blockchain transaction data including a second blockchain address. The electronic device may obtain the second blockchain address from the transaction data. In operation 1720, the electronic device may obtain first information and signature data based on the second blockchain address. For example, the electronic device may identify whether a first blockchain address identical to the second blockchain address is stored in a storage based on the second blockchain address. When the first blockchain address matched with the second blockchain address is identified, the electronic device may retrieve information (e.g., first information, a digital signature value, and second information) associated and stored with the first blockchain address. For example, the electronic device may retrieve data associated and stored with the second blockchain address.

In operation 1730, the electronic device may perform a digital signature for the second blockchain address and the first information based on a private key. In operation 1740, the electronic device may compare the digitally signed value with the signature data obtained in operation 1720. When the value obtained by performing the digital signature for the second blockchain address and the first information is not identical to the signature data obtained in operation 1720, in operation 1755, the electronic device may display an error screen indicating that the digital signature is not normally performed. According to another embodiment of the disclosure, the electronic device may decrypt the signature data obtained in operation 1720 using a public key. The electronic device may compare the decrypted signature data with the second blockchain address and the first information to verify validity for the digitally signed value.

When the value obtained by performing the digital signature for the second blockchain address and the first information is identical to the signature data obtained in operation 1720, in operation 1750, the electronic device may display a transaction contents screen including the first information and information about transaction records included in transaction data.

In operation 1760, the electronic device may identify a transaction target using the first information on the transaction contents screen and may receive a user input approving transaction contents from a user who identifies transaction records for the transaction target. When the user input approving the transaction contents is received, in operation 1770, the electronic device may perform a digital signature for blockchain transaction data. The electronic device may deliver a transaction corresponding to the blockchain transaction data to a blockchain network to be generated as a block.

Figure 18:
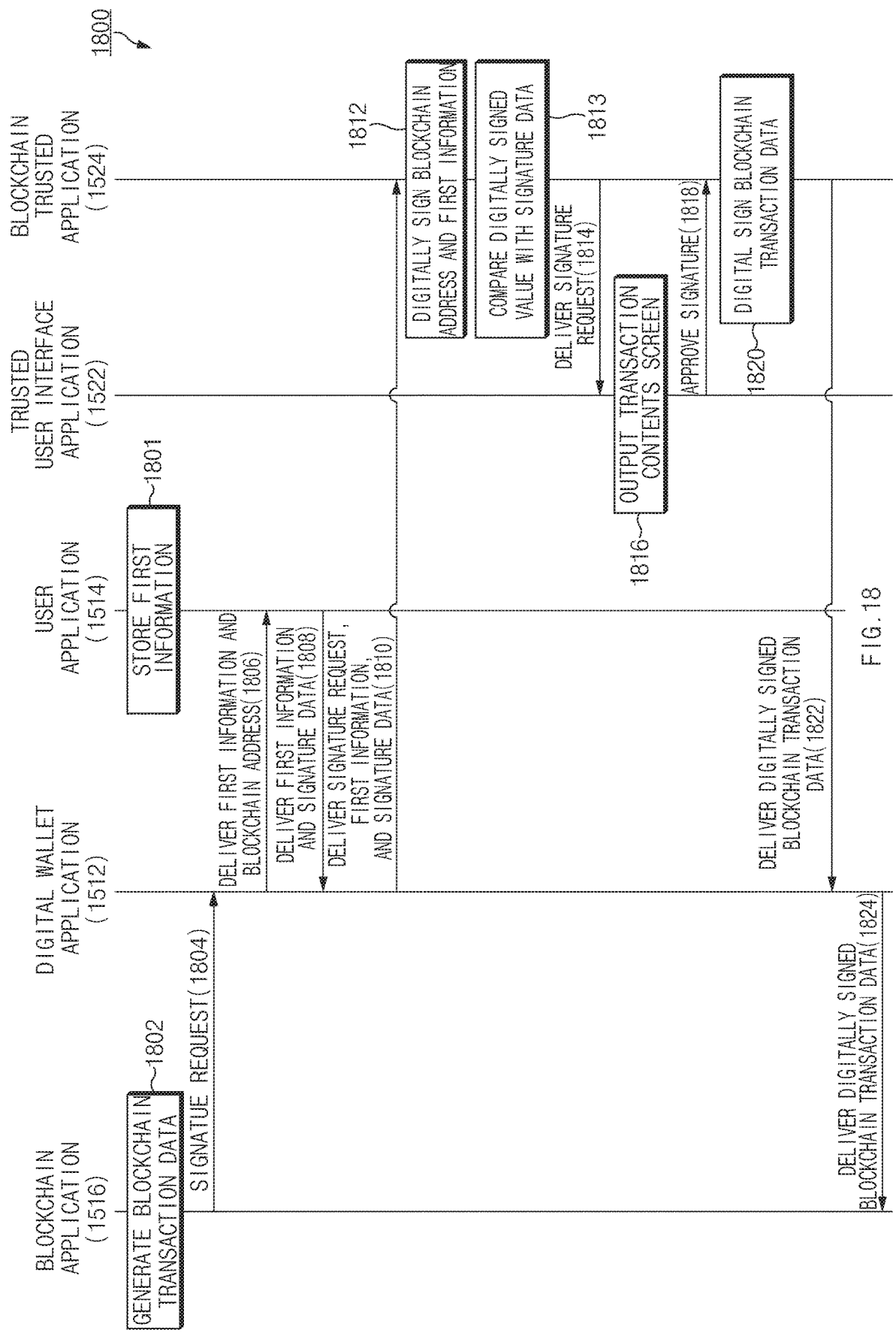
FIG. 18 is a signal sequence diagram for performing a digital signature for blockchain transaction data based on first information stored in an electronic device according to an embodiment of the disclosure.

FIG. 18 is a flowchart 1800 illustrating a process for performing a digital signature for blockchain transaction data based on first information stored in an electronic device according to an embodiment of the disclosure.

Referring to FIG. 18, in operation 1801, a user application 1514 may associate and store the first information with a first blockchain address and signature data for the first blockchain address and first information. For example, after the process shown in FIG. 16 is performed, the user application 1514 may associate and store the first information with the first blockchain address and the signature data for the first blockchain address and the first information depending on a request of a digital wallet application 1512. In operation 1802, the blockchain application 1516 may generate blockchain transaction data including a second blockchain address. The blockchain application 1516 may transmit blockchain transaction data generated by interworking with a blockchain network. The blockchain application 1516 may interwork with a node configuring the blockchain network to generate a transaction. The blockchain application 1516 may be an application requesting a digital wallet to perform a signature for a transaction. According to an embodiment of the disclosure, the blockchain application 1516 may be separately operated according to a type (e.g., Ethereum, Bitcoin, or the like) of a blockchain. For example, the blockchain application 1516 may generate blockchain transaction data for processing remittance to the second blockchain address. In operation 1804, the blockchain application 1516 may request a signature for the blockchain transaction data from a digital wallet application 1512. For example, the blockchain application 1516 may deliver data necessary for a signature to the digital wallet application 1512 to generate a blockchain transaction. In operation 1806, the digital wallet application 1512 may deliver a request for retrieving the first information and the signature data to the user application 1514 based on the second blockchain address included in the blockchain transaction data. According to an embodiment of the disclosure, the digital wallet application 1512 may directly access data of the electronic device to retrieve the first information and the signature data. For example, when the digital wallet application 1512 has the right to access a memory of the electronic device, it may identify the first information and the signature data associated with a blockchain address from the stored data.

When the second blockchain address is identical to the first blockchain address, in operation 1808, the user application 1514 may deliver the first information and the signature data, which are associated and stored with the first blockchain address, to the digital wallet application 1512. According to another embodiment of the disclosure, when the user application 1514 delivers the first information and the signature data associated and stored with the first blockchain address to the digital wallet application 1512 in operation 1808, the digital wallet application 1512 may determine whether the second blockchain address is identical to the first blockchain address. When the second blockchain address is identical to the first blockchain address, the digital wallet application 1512 may perform operation 1810.

In operation 1810, the digital wallet application 1512 may deliver the signature request for the blockchain transaction data, the first information, and the signature data to a blockchain TA 1524. In operation 1812, the blockchain TA 1524 may perform a digital signature for a blockchain address (the first blockchain address or the second blockchain address) and the first information. In operation 1813, the blockchain TA 1524 may compare the value generate as a result of performing the digital signature with the received signature data.

When the two data are identical to each other as a result of the comparison, in operation 1814, the blockchain TA 1524 may deliver transaction records corresponding to the signature request and the first information to a TUI application 1522. The transaction records corresponding to the signature request may be transaction records included in blockchain transaction data, a signature of which is requested. According to an embodiment of the disclosure, the transaction records included in the blockchain transaction data may include at least one of a blockchain address of a receiver, which is capable of being used when generating a blockchain transaction, a blockchain address of a sender, a type of cryptocurrency to be transacted, or the amount of transmitted cryptocurrencies. According to an embodiment of the disclosure, the blockchain TA 1524 may deliver the transaction records and the first information to the TUI application 1522 through the digital wallet application 1512.

In operation 1816, the TUI application 1522 may output a transaction contents screen including the transaction records and the first information on the display. The TUI application 1522 may receive a user input approving a signature for transaction data corresponding to the transaction contents screen. According to an embodiment of the disclosure, the TUI application 1522 may execute a user authentication process (e.g., biometric authentication, a personal identification number (PIN), or the like) of receiving authentication information for authenticating the user in a process of receiving a user input approving the user input approving the signature. The user authentication process may include, for example, an operation of outputting the screen shown in FIG. 12, an operation of receiving authentication information for authenticating the user, and an operation of comparing the entered authentication information with information registered for the user.

In operation 1818, in response to the user input approving the signature for the transaction data, the TUI application 1522 may deliver a request to proceed with a digital signature for the transaction data to the blockchain TA 1524. In operation 1820, the blockchain TA 1524 may perform a digital signature for blockchain transaction data based on a private key of the user used for a blockchain transaction.

When the digitally signed blockchain transaction data is delivered to the digital wallet application 1512 in operation 1822, in operation 1824, the digital wallet application 1512 may deliver the digitally signed blockchain transaction data to the blockchain network through the blockchain application 1516.

FIG. 19 is a drawing illustrating a process where an electronic device obtains and stores token information according to an embodiment of the disclosure.

According to an embodiment of the disclosure, the electronic device may receive a plurality of token information verified by a token information providing system from a token information providing network. The electronic device may receive the plurality of token information and may authenticate the plurality of token information through a series of processes.

Referring to FIG. 19, the electronic device may display a function screen 1910 including a menu item 1912 for receiving verified token information. When the menu item 1912 for receiving the verified token information is selected by a user, the electronic device may display a token list screen 1920 including a receivable token information list 1922.

According to an embodiment of the disclosure, the electronic device may transmit a token address to the token information providing network via a communication circuitry of the electronic device to obtain token information from the token information providing network. The electronic device may obtain token information (e.g., a token name or a token icon) in response to the transmitted token address.

According to an embodiment of the disclosure, the electronic device may allow the user to sequentially authenticate each toke information through screens 1931 and 1932 sequentially displaying token information about tokens selected from the token information list 1922.

For example, the electronic device may obtain token information corresponding to a blockchain address from the outside and may output the token information list 1922 displaying the obtained token information. The electronic device may receive a user input selecting a token mapped to the blockchain address on the token information list 1922. When the token is selected based on the user input, the electronic device may receive a user input sequentially authenticating each token information from the user through the screens 1931 and 1932. When the user input authenticating the token information is received, the token information may be first information to be mapped and stored to the blockchain address. Herein, FIG. 19 is, but is not limited to, an example for describing an embodiment. For example, the electronic device may display all of token information on one screen. For another example, the electronic device may move a screen depending on a scroll input of the user such that the user identifies each token information.

Figure 20:
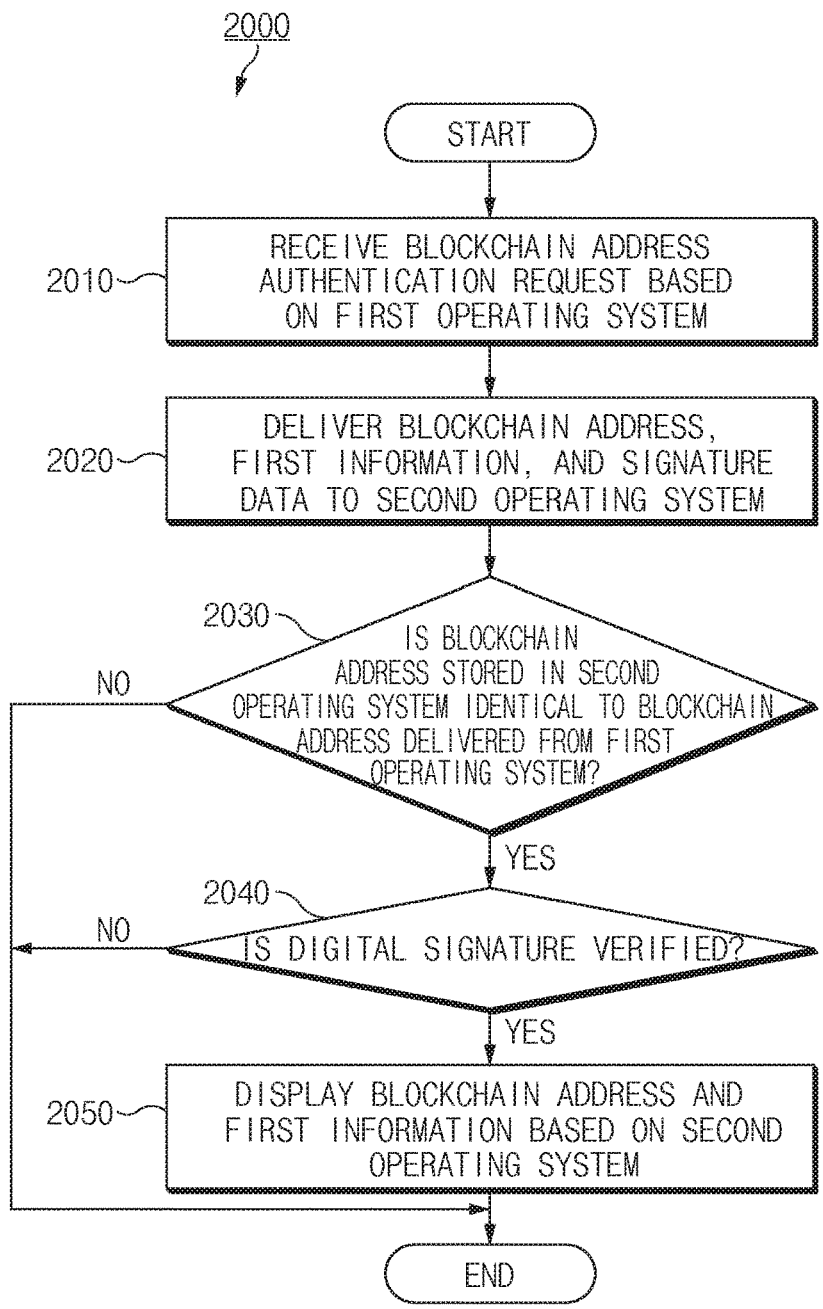
FIG. 20 is a flowchart illustrating a process where an electronic device outputs a blockchain address and first information based on heterogeneous operating systems according to an embodiment of the disclosure.

FIG. 20 is a flowchart 2000 illustrating a process where an electronic device outputs a blockchain address and first information based on heterogeneous operating systems, according to an embodiment of the disclosure.

Referring to FIG. 20, in operation 2010, the electronic device may receive a blockchain address authentication request based on a first operating system (e.g., a rich operating system). For example, the electronic device may receive a user input selecting a verify button for a blockchain address and first information through a digital wallet application or another user application (e.g., a contact application).

In operation 2020, in response to the blockchain address authentication request, the electronic device may deliver a blockchain address, first information, and signature data corresponding to the blockchain address authentication request to a second operating system (e.g., a trusted operating system).

In operation 2030, based on the second operating system, the electronic device may determine whether a blockchain address stored in the second operating system is identical to the blockchain address transmitted from the first operating system in operation 2020. Because the blockchain address is unique information, the electronic device may use a blockchain address as an index of signature data. According to an embodiment of the disclosure, the electronic device may store an authenticated address in a memory area (e.g., a TEE) managed by the second operating system and may limit access to the stored address. For example, when the user authenticates a blockchain address in FIG. 16, the electronic device may store at least one of the authenticated blockchain data, signature data, or first information in the memory area managed by the second operating system. According to an embodiment of the disclosure, the memory area managed by the second operating system may be an area in the electronic device and may be stored in a separate memory with strengthened security, which is outside the electronic device. According to an embodiment of the disclosure, the memory area managed by the second operating system may include an external server. For example, the electronic device may transmit at least one of first information, a blockchain address, or signature data, which is authenticated according to user authentication in FIG. 16, to a third server to be stored through the third server.

When the blockchain address stored in the second operating system is identical to the blockchain address transmitted from the first operating system in operation 2020 in operation 2030, in operation 2040, the electronic device may verify a digital signature. For example, the electronic device may digitally sign the blockchain address and the first information based on a private key and may compare the digitally signed value with the signature data transmitted in operation 2020. When the digitally signed value is matched with the signature data as a result of the comparison, the electronic device may determine that the digital signature is valid.

When it is verified that the digital signature is valid, in operation 2050, the electronic device may display the blockchain address and the first information on its display based on the second operating system. For example, the electronic device may display the blockchain address and the first information on a screen displaying transaction (e.g., cryptocurrency remittance) records for the blockchain address. According to an embodiment of the disclosure, the electronic device may further display second information indicating reliability for the blockchain address and the first information.

Figure 21:
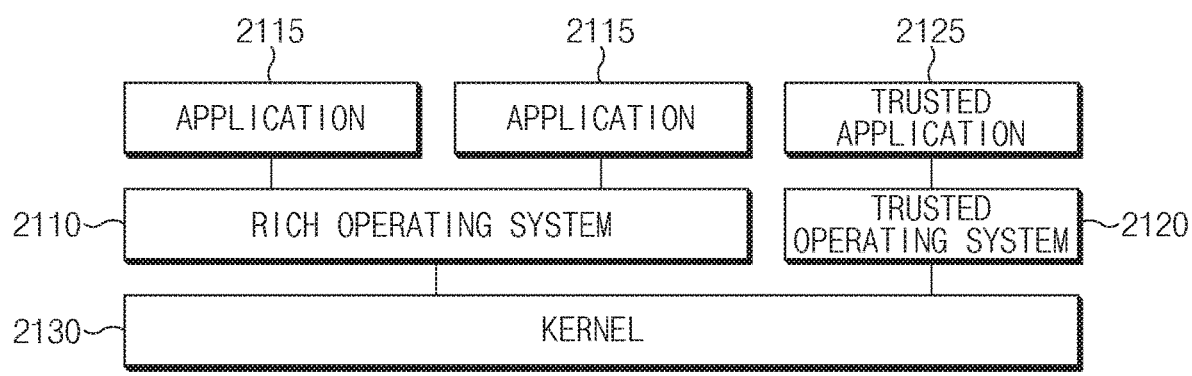
FIG. 21 is a block diagram illustrating a structure of an application, an operating system, and a kernel included in an electronic device according to an embodiment of the disclosure.

FIG. 21 is a block diagram illustrating a structure of an application, an operating system, and a kernel included in an electronic device according to an embodiment of the disclosure.

Referring to FIG. 21, the electronic device according to an embodiment may be configured to include a rich operating system 2110, an application 2115, a trusted operating system 2120, a trusted application 2125, and a kernel 2130.

The application 2115 may operate based on the rich operating system 2110 and may operate based on the trusted application 2125. The rich operating system 2110 and the trusted operating system 2120 may operate based on the kernel 2130. For example, the rich operating system 2110 and the trusted operating system 2120 may be assigned resources necessary for an operation of the application 2115 or the trusted application 2125 through the kernel 2130.

Figure 22:
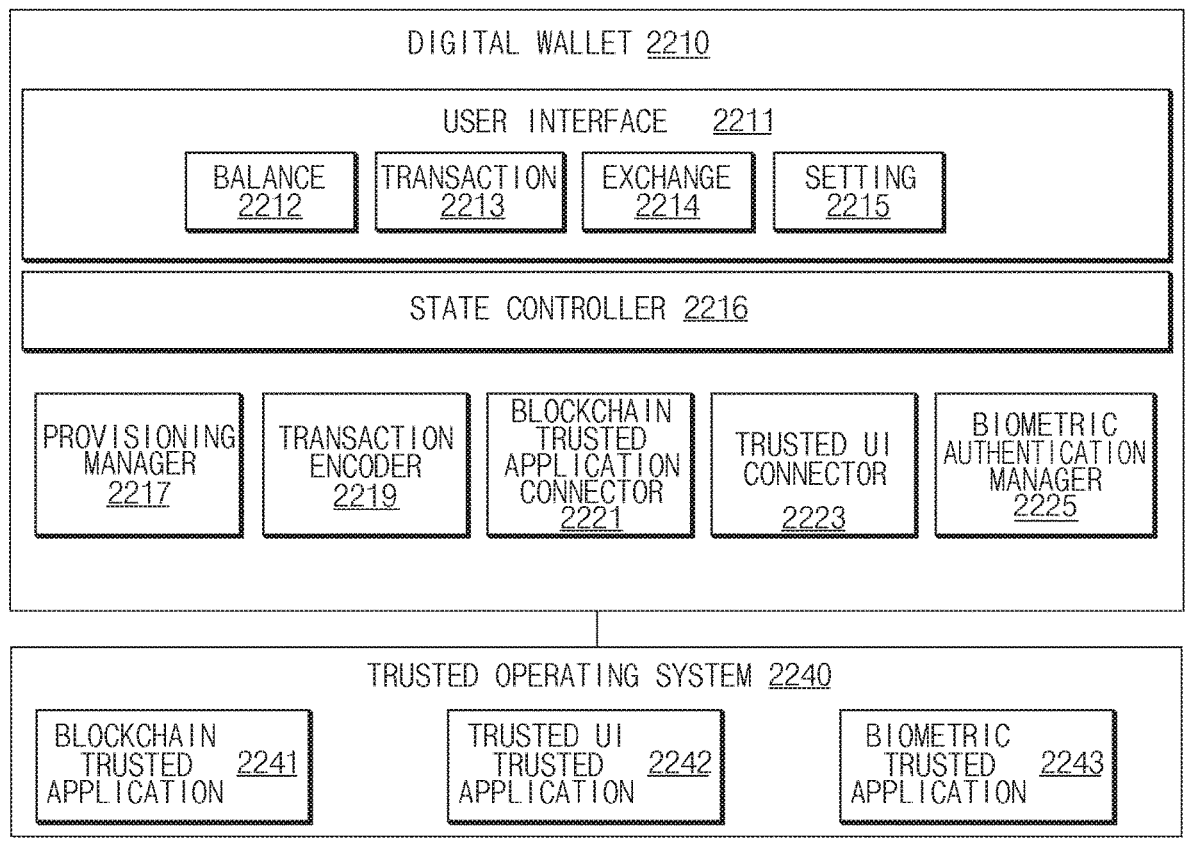
FIG. 22 is a drawing illustrating a structure of a digital wallet configured using an electronic device according to an embodiment of the disclosure.

FIG. 22 is a drawing illustrating a structure of a digital wallet configured using an electronic device, according to an embodiment of the disclosure.

According to an embodiment of the disclosure, the electronic device may include a digital wallet 2210, which operates based on a rich operating system, and a trusted operating system 2240.

Referring to FIG. 22, the digital wallet 2210 according to an embodiment may include a user interface 2211, a state controller 2216, a provisioning manager 2217, a transaction encoder 2219, a blockchain trusted application connector 2221, a trusted user interface (UI) connector 2223, and a biometric authentication manager 2225. According to an embodiment of the disclosure, the user interface 2211 may include modules (a balance 2212, a transaction 2213, an exchange 2214, and a setting 2215) for display or processing information necessary for a blockchain transaction of a user.

According to an embodiment of the disclosure, the state controller 2216 may include an uppermost application which manages a process where a blockchain transaction is performed in the electronic device. The state controller 2216 may load or unload one or more trusted applications depending on a request (e.g., generation of a seed, recovery of the seed, or a digital signature) received via the user interface 2211. The state controller 2216 may deliver a detailed command to perform the request received via the user interface 2211 to a trusted application.

The provisioning manager 2217 may perform integrity testing when running an application associated with the digital wallet 2210. For example, in a process of performing a user registration process (e.g., agreement on terms and conditions or exchange of terms and conditions), the provisioning manager 2217 may perform an operation of allowing the user to perform fingerprint registration or PIN registration. Alternatively, when a seed associated with a blockchain transaction is not stored, the provisioning manager 2217 may allow the electronic device to output a seed generation screen. Furthermore, the provisioning manager 2217 may determine a software version and may update software. The transaction encoder 2219 may manage a blockchain transaction. The transaction encoder 2219 may convert transaction data which is not signed into transaction data digitally signed. The transaction encoder 2219 may generate transaction data packaged with one bytes column to be received in a blockchain node. When the digital signature is performed by a trusted application, the transaction encoder 2219 may package data depending on a blockchain protocol using transaction data, which is not digitally signed, a signature value, and an additional parameter.

The blockchain trusted application connector 2221 may perform communication for the blockchain trusted application 2241 of the digital wallet 2210. The trusted UI connector 2223 may communicate with a trusted UI trusted application 2242. A trusted application connector (e.g., the blockchain trusted application connector 2221 or the trusted UI connector 2223) may be a module corresponding to a trusted application performed in the trusted operating system 2240. The trusted application connector may serialize or deserialize a command to be delivered to the trusted application. The trusted application connector may receive the result of performing a command delivered to the trusted application and may deliver the received result to a higher model of the trusted application connector.

The biometric authentication manager 2225 may communicate with the biometric trusted application 2243 to perform biometric authentication. The biometric authentication manager 2225 may deliver an authentication request to a biometric authentication service of the electronic device. The biometric authentication manager 2225 may deliver the result of performing the biometric authentication to a higher module.

The trusted operating system 2240 may include the blockchain trusted application 2214, the trusted UI trusted application 2242, and the biometric trusted application 2243. According to an embodiment of the disclosure, the trusted operating system 2240 may refer to a separated trusted code for controlling access to a certain trusted zone in a kernel, rather than a separate operating system. For example, data stored in the trusted zone may be encrypted by the trusted code and access to the data stored in the trusted zone may be controlled to enhance security. According to an embodiment of the disclosure, the trusted operating system 2240 may operate separately from a rich operating system or may operate with the rich operating system. The trusted operating system 2240 may be a function of operating separately from a kernel stage. According to an embodiment of the disclosure, the trusted operating system 2240 may operate with the rich operating system without separately operating, and the trusted UI trusted application 2242 and the biometric trusted application 2243 may be included in one digital wallet 2210 to operate. The blockchain trusted application 2241 may verify a digital signature depending on a request of the digital wallet 2210. According to an embodiment of the disclosure, the blockchain trusted application 2241 may store a private key or a public key for a digital signature.

The trusted UI trusted application 2242 may display a blockchain address and first information in a state where security is maintained and may receive a user input to the displayed security information. For example, when an operation needing security is performed, a UI may be displayed by means of the trusted UI trusted application 2242. When the user separately perform biometric authentication, biometric authentication may be performed by means of the biometric trusted application 2243.

According to an embodiment of the disclosure, the electronic device may continue identifying a blockchain account based on a certain time period. For example, before the user performs a transaction, the electronic device may periodically identify validity for blockchain addresses over a network accessible by the electronic device and may update the changed blockchain address. According to an embodiment of the disclosure, the electronic device may periodically update a blockchain address or personal information stored in the electronic device. The update on the information may be performed based on a period preset by the user or a period automatically set by a system. According to an embodiment of the disclosure, when the blockchain address or the personal information stored in the electronic device is changed, the electronic device may be configured to update the information by a specific event. For example, the electronic device may receive information about a blockchain address which is determined as an account of a hacker or is used for hacking. The electronic device may receive an update message associated with the information from an external electronic device. In response to the received update message, the electronic device may replace a blockchain address matched with information included in the update message among blockchain addresses stored in the electronic device with a blockchain address obtained from a blockchain network. According to an embodiment of the disclosure, the information about the validity of the blockchain address may be used to identify transaction information, balance information, or the result of authentication by a reliable institution through a function provided from a blockchain network (e.g., a blockchain main network). For example, to identify validity for a blockchain address, the electronic device may perform an authentication request through the function provided from the blockchain main network. The blockchain main network may provide the electronic device with authentication information indicating the result of determining validity, which is performed based on the address. According to an embodiment of the disclosure, the electronic device may share authentication information about a blockchain account address with a surrounding electronic device. For example, the electronic device may authenticate validity of a blockchain address over the blockchain main network and may deliver the authenticated blockchain address and information corresponding to the blockchain address to another electronic device. For example, the electronic device may deliver the authenticated blockchain address to a smart watch connected with the electronic device, and the smart watch may display information associated with the blockchain address.

Figure 23:
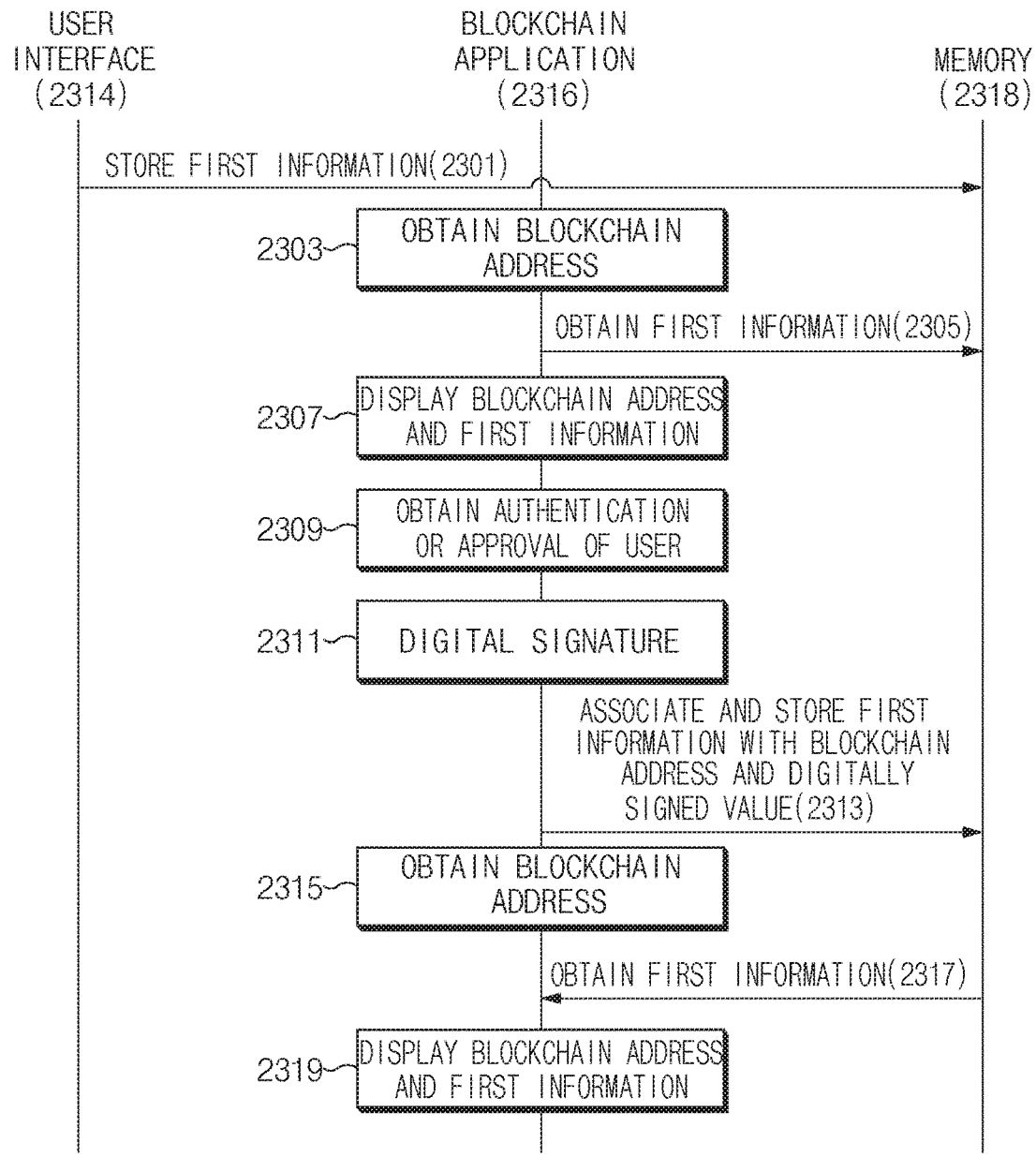
FIG. 23 is a signal sequence diagram illustrating a process performed by an electronic device according to an embodiment of the disclosure.

FIG. 23 is a signal sequence diagram 2300 illustrating a process performed by an electronic device according to an embodiment of the disclosure. According to an embodiment of the disclosure, at least one integrated application may process an operation of the blockchain application, the digital wallet application, the trusted user interface application, or the blockchain trusted application.

Referring to FIG. 23, in operation 2301, the electronic device may store first information in a storage using a rich application 2314. For example, when the rich application 2314 is a contact application, the electronic device may store the first information (e.g., an owner name of a phone number) associated with contact information (e.g., the phone number) in the storage.

In operation 2303, the electronic device may obtain a blockchain address by means of the blockchain application 2316. In operation 2305, the electronic device may obtain the first information stored in a memory 2318. For example, the blockchain application 2316 may include instructions causing the electronic device to display contact information stored in the memory 2318 and receive a user input selecting the first information among the displayed contact information.

According to an embodiment of the disclosure, in operation 2307, the blockchain application 2316 may allow the electronic device to display the blockchain address and the first information on a display of the electronic device. In operation 2309, the blockchain application 2316 may obtain authentication or approval for that a user associates and stores two pieces of information (e.g., operation 1609 of FIG. 16). According to an embodiment of the disclosure, in operation 2311, when the user performs authentication, the electronic device ma perform a digital signature using a private key used for the digital signature when generating a blockchain transaction with respect to the first information and the blockchain address. In operation 2313, the electronic device may store data (e.g., the first information or the blockchain address) associated with the digitally signed result (e.g., the digitally signed value) together in the memory 2318. According to an embodiment of the disclosure, the electronic device may store the first information, the blockchain address, or the digital signature value in an untrusted memory area or a trusted memory area. For example, the untrusted memory area may be a memory 130 of FIG. 1. For example, the trusted memory area may include a memory with strengthened security, which is logically or physically divided. According to an embodiment a logical trusted memory area may logically divide and set a portion of the untrusted memory area (e.g., the memory 130 of FIG. 1). For example, logically dividing and setting may include an operation where the electronic device sets a partial address of the memory to a trusted zone and where access to a corresponding memory area is performed by only a separate application, a separate application programming interface (API), or a separate function or trusted operating system when storing or reading information.

In operations 2315 and 2317, the electronic device may obtain the blockchain address and the first information. In operation 2319, the electronic device may provide the user with the blockchain address and the first information. According to an embodiment of the disclosure, the electronic device may display the blockchain address and the first information together or may display the blockchain address, the first information or second information (e.g., graphic information) associated with reliability of the blockchain address together.

According to an embodiment of the disclosure, when generating a blockchain transaction, the electronic device may identify whether a blockchain address (e.g., a second blockchain address) of a destination included in the blockchain transaction is stored in the memory 2318. For example, when the second blockchain address corresponds to the first blockchain address stored in the memory 2318, the electronic device may perform a digital signature (e.g., a digital signature using a private key used when generating a blockchain transaction) for the first information and the second blockchain address, which are associated and stored with the first blockchain address, and may compare a digital signature value obtained as a result of performing the digital signature with a digital signature value stored in the storage. For example, when the digital signature value obtained as a result of performing the digital signature is identical to the digital signature value stored in the storage, the electronic device may display the first information associated with the second blockchain address on the display.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory storage medium" means a tangible device, and does not include a signal (e.g., an electromagnetic wave), but this term does not differentiate between where data is semi-permanently stored in the storage medium and where the data is temporarily stored in the storage medium. For example, "the non-transitory storage medium" may include a buffer where data is temporally stored.

According to an embodiment of the disclosure, a method according to various embodiments of the disclosure may be included and provided in a computer program product. The computer program product may be traded as a product between a seller and a buyer. The computer program product (e.g., downloadable app)) may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

According to embodiments disclosed in the disclosure, the electronic device and the method for managing the blockchain address in the electronic device are provided to verify the blockchain address without the necessity that the user identifies whether the blockchain address is correctly input and allow the user to easily recognize information associated with the address.

Furthermore, according to embodiments disclosed in the disclosure, the electronic device and the method for managing the blockchain address in the electronic device are provided to provide the user with familiar information and allow the user to easily identify the blockchain address.

Furthermore, according to embodiments disclosed in the disclosure, information associated with a blockchain address may be stored using a storage space with strengthened security. The storage space with the strengthened security may include, for example, a trusted space physically divided and a trusted space logically divided. For example, the trusted space physically divided may have a separate memory space which is present inside or outside the electronic device. The electronic device may access a physical trusted space by means of a separate trusted application or function. The trusted space logically divided may be a trusted zone logically separated from an untrusted zone in one storage space (memory). To access the logical trusted zone, the electronic device may access the trusted zone by only a separate trusted application or function (e.g., API). For example, to access the logical trusted zone, a separate operating system (e.g., a trusted operating system) may be operated. A rich operating system may request the trusted operating system to access the logical trusted zone. The trusted operating system may verify the request and may access the logical trusted zone only when the request is a normal request. According to an embodiment of the disclosure, the trusted operating system may operate as a separate operating system or an operating system where software included in a kernel in the rich operating system is virtually divided. According to an embodiment of the disclosure, the storage space may include a memory space in the electronic device. For example, the electronic device may store general data in one memory without separately dividing the trusted zone. The storage space with the strengthened security may control access to at least a partial memory area of the electronic device. For example, the at least a partial memory area may be a trusted memory area accessible by means of only a separate trusted operating system and or a separate trusted kernel. The electronic device may access a blockchain address or related information stored in the trusted memory area through only separate authentication by means of the trusted operating system or the trusted kernel. Alternatively, the blockchain address and the related information may be encrypted to be decrypted by only a key in the trusted operating system or the trusted zone, thus being stored in a storage space in the untrusted zone. The electronic device and the method for managing the blockchain address in the electronic device are provided to perform additional authentication and perform a blockchain transaction only when the additional authentication is completed to strengthen security for a blockchain transaction.

According to an embodiment of the disclosure, the electronic device and the method for managing the blockchain address in the electronic device are provided to enhance usability for a blockchain address because of using a variety of information through authentication (e.g., biometric authentication).

According to an embodiment of the disclosure, the electronic device and the method for managing the blockchain address in the electronic device are provided to continue using the authenticated information in a transaction although the user changes his or her terminal device. For example, because the authenticated information is distributed and stored in the blockchain network, the user may obtain and use the authenticated information from the blockchain network although changing the terminal device.

In addition, various effects ascertained directly or indirectly through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a display; and
at least one processor connected with the display,
wherein the at least one processor is configured to:
perform a digital signature for a blockchain address and first information associated with the blockchain address using a private key,
associate and store signature data obtained as a result of performing the digital signature with at least one of the blockchain address or the first information,
perform authentication for the blockchain address and the first information using a public key corresponding to the private key, based on the stored signature data,
control the display to display the blockchain address and the first information, based on a result of performing the authentication,
operate a rich operating system and a trusted operating system,
transmit the first information and the blockchain address from a first application of the rich operating system to a second application of the trusted operating system, in response to a request to authenticate the blockchain address,
obtain an approval command for the first information and the blockchain address by the second application,
generate the signature data for the first information and a first blockchain address using the private key by a third application of the trusted operating system, in response to the approval command, and
store the signature data in a memory of the electronic device by the first application.

2. The electronic device of claim 1, wherein the at least one processor is further configured to:
when there is a failure in the authentication, output information corresponding to the failure on the display.

3. The electronic device of claim 1, wherein the at least one processor is further configured to:
when there is a success in the authentication, control the display to display second information indicating reliability associated with a correlation between the blockchain address and the first information.

4. The electronic device of claim 3, wherein the at least one processor is further configured to:
determine the reliability based on at least one of whether a mapping relationship between the blockchain address and the first information is authenticated, a category to which the first information belongs, or information about a transaction history for the blockchain address.

5. The electronic device of claim 3, wherein the at least one processor is further configured to:
when the request to authenticate the blockchain address is generated, output the blockchain address and the first information,
receive the approval command to map the first information to the blockchain address, and
associate and store the signature data with at least one of the blockchain address or the first information, in response to the approval command.

6. The electronic device of claim 1,
wherein the first application includes a digital wallet application,
wherein the second application is a trusted user interface application, and
wherein the third application is a blockchain trusted application.

7. The electronic device of claim 5, wherein the private key is used for a user of the electronic device to perform a blockchain transaction.

8. The electronic device of claim 5, wherein the at least one processor is further configured to:
execute a user authentication process of verifying a user who inputs the approval command.

9. The electronic device of claim 5,
wherein the first information includes token information identifying a token used for a token transaction, and
wherein the at least one processor is configured to:
store the signature data in a token information storing area of a memory of the electronic device.

10. The electronic device of claim 9, further comprising:
a communication circuitry configured to communicate with a network outside the electronic device,
wherein the at least one processor is further configured to:
obtain the token information from a token information providing network via the communication circuitry.

11. The electronic device of claim 5, wherein the second information output on the display includes a first image, in a first case where the signature data associated with the blockchain address is stored in a memory of the electronic device, includes a second image, in a second case where there is a transaction history including the blockchain address or where the first information meets a predetermined condition, and includes a third image, in a third case rather than the first case and the second case.

12. The electronic device of claim 1, wherein the first application obtains the first information including contact information of a blockchain transaction target indicated by a first blockchain address obtained from a user application of the rich operating system.

13. An electronic device comprising:
a display;
a memory associating and storing first information associated with a blockchain transaction target with a blockchain address; and
at least one processor connected with the display and the memory,
wherein the at least one processor is configured to:
generate blockchain transaction data to be transmitted to a blockchain network,
obtain the first information based on the blockchain address included in the blockchain transaction data,
perform authentication for the blockchain address and the first information based on a private key,
output the blockchain address and the first information, when the authentication is valid,
receive a user input approving the blockchain transaction data,
perform a digital signature for the blockchain transaction data using the private key, in response to the user input,
transmit the digitally signed blockchain transaction data to the blockchain network,
operate a rich operating system and a trusted operating system,
receive a signature request for the blockchain transaction data by a first application of the rich operating system,
retrieve the first information and signature data corresponding to the blockchain address included in the signature request, in response to the signature request,
when the first information is retrieved, transmit the blockchain address, the retrieved first information, and the retrieved signature data from the first application to a third application of the trusted operating system,
compare the blockchain address stored in the memory with the blockchain address received from the first application by the third application and compare a digitally signed value with a value of the signature data stored in the memory and generated based on a private key with respect to the blockchain address and the first information by the third application,
output a screen including the blockchain address and the first information on the display by a second application of the trusted operating system, based on a result of the comparison of the blockchain address stored in the memory with the blockchain address received from the first application and the comparison of the digitally signed value with the value of the signature data stored in the memory and generated based on the private key with respect to the blockchain address and the first information, and
perform the digital signature for the blockchain transaction data using the private key in response to the user input by the third application.

14. The electronic device of claim 13,
wherein the memory associates and stores the signature data for the first information and the blockchain address with the blockchain address, and
wherein the at least one processor is further configured to:
compare the value obtained by digitally signing the blockchain address included in the blockchain transaction data and the obtained first information with the value of the signature data based on the private key to perform the authentication,
determine that the authentication is valid, when the digitally signed value is identical to the value of the signature data, and
determine that the authentication is not valid, when the digitally signed value is different from the value of the signature data.

15. A method for managing a blockchain address in an electronic device, the method comprising:
performing a digital signature for a blockchain address and first information associated with the blockchain address using a private key;
associating and storing signature data obtained as a result of performing the digital signature with at least one of the blockchain address or the first information;
performing authentication for the blockchain address and the first information using a public key corresponding to the private key, based on the stored signature data; and
displaying the blockchain address and the first information on a display of the electronic device, based on a result of performing the authentication,
wherein the performing of the digital signature comprises:
operating a rich operating system and a trusted operating system;

transmitting the first information and the blockchain address from a first application of the rich operating system to a second application of the trusted operating system, in response to a request to authenticate the blockchain address;

obtaining an approval command for the first information and the blockchain address by the second application;

generating the signature data for the first information and a first blockchain address using the private key by a third application of the trusted operating system, in response to the approval command; and storing the signature data in a memory of the electronic device by the first application.

16. The method of claim 15, wherein the displaying of the blockchain address and the first information includes:

displaying second information indicating reliability associated with the blockchain address and the first information.

17. The method of claim 15, wherein the displaying of the blockchain address and the first information includes:

generating or receiving a request to authenticate the blockchain address; and outputting the blockchain address and the first information on the display in response to the request, and wherein the performing of the authentication includes:

receiving the approval command to map the first information to the blockchain address; and associating and storing the signature data obtained by digitally signing the blockchain address and the first information with the blockchain address and the first information based on the private key, in response to the approval command.

18. A method for performing a blockchain transaction in an electronic device, the method comprising:

associating and storing first information associated with a blockchain transaction target with a blockchain address;

operating a rich operating system and a trusted operating system;

generating blockchain transaction data to be transmitted to a blockchain network;

receiving a signature request for the blockchain transaction data by a first application of the rich operating system;

retrieving the first information and signature data corresponding to the blockchain address included in the signature request, in response to the signature request;

when the first information is retrieved, transmitting the blockchain address, the retrieved first information, and the retrieved signature data from the first application to a third application of the trusted operating system;

performing authentication for the blockchain address and the first information based on a private key, wherein the performing comprises comparing the blockchain address stored in a memory with the blockchain address received from the first application by the third application and compare a digitally signed value with a value of the signature data stored in the memory and generated based on a private key with respect to the blockchain address and the first information by the third application;

outputting a screen including the blockchain address and the first information on a display by a second application of the trusted operating system, based on a result of the comparison of the blockchain address stored in the memory with the blockchain address received from the first application and the comparison of the digitally signed value with the value of the signature data stored in the memory and generated based on a private key with respect to the blockchain address and the first information;

receiving a user input approving the blockchain transaction data; and performing a digital signature for the blockchain transaction data using the private key, in response to the user input by the third application.

* * * * *